(12) United States Patent
Horita et al.

(10) Patent No.: US 11,267,666 B2
(45) Date of Patent: Mar. 8, 2022

(54) DRIVE TRANSMITTER, SHEET FEEDING DEVICE INCORPORATING THE DRIVE TRANSMITTER, AND IMAGE FORMING APPARATUS INCORPORATING THE DRIVE TRANSMITTER

(71) Applicants: Hirofumi Horita, Kanagawa (JP); Jumpei Aoyama, Kanagawa (JP)

(72) Inventors: Hirofumi Horita, Kanagawa (JP); Jumpei Aoyama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 224 days.

(21) Appl. No.: 16/583,866

(22) Filed: Sep. 26, 2019

(65) Prior Publication Data

US 2020/0102168 A1  Apr. 2, 2020

(30) Foreign Application Priority Data

Sep. 27, 2018  (JP) .............................. JP2018-182977

(51) Int. Cl.
*B65H 5/06* (2006.01)
*F16D 1/10* (2006.01)
*B65H 3/06* (2006.01)

(52) U.S. Cl.
CPC ............ *B65H 3/0669* (2013.01); *B65H 5/06* (2013.01); *F16D 1/101* (2013.01); *B65H 2402/63* (2013.01); *B65H 2404/1316* (2013.01); *B65H 2601/324* (2013.01)

(58) Field of Classification Search
CPC ................. B65H 5/06; B65H 2402/63; B65H 2404/1316; F16D 1/101
See application file for complete search history.

(56) References Cited

U.S. PATENT DOCUMENTS

| | | | |
|---|---|---|---|
| 7,971,872 B2 * | 7/2011 | Omura | G03G 21/186 271/162 |
| 7,992,859 B2 * | 8/2011 | Shiina | G03G 15/6511 271/109 |
| 2014/0049000 A1 | 2/2014 | Kimura et al. | |

(Continued)

FOREIGN PATENT DOCUMENTS

| | | | |
|---|---|---|---|
| JP | 11043229 A | * | 2/1999 |
| JP | 2002-265078 | | 9/2002 |
| JP | 2002-341658 | | 11/2002 |

*Primary Examiner* — Patrick Cicchino
(74) *Attorney, Agent, or Firm* — Harness, Dickey & Pierce, P.L.C.

(57) ABSTRACT

A drive transmitter includes a first unit including a coupling portion having grooves spaced at an angle of 180 degrees in the rotational direction, and a second unit having projections spaced at an angle of 180 degrees in the rotational direction. The projections are configured to be inserted into the grooves of the coupling portion. The coupling portion has a guiding portion and a non-guiding portion. The guiding portion is sloped, with a height from a bottom face of the grooves decreasing in the rotational direction of the first unit, and is configured to guide the projections to the grooves. The non-guiding portion is disposed at a point symmetrical position to the guiding portion to an axial center of the first unit. One of the projections is not in contact with the non-guiding portion while another one of the projections is in contact with the guiding portion.

14 Claims, 14 Drawing Sheets

(56) References Cited

U.S. PATENT DOCUMENTS

| | | |
|---|---|---|
| 2014/0077444 A1 | 3/2014 | Fujii et al. |
| 2014/0103603 A1 | 4/2014 | Horita et al. |
| 2014/0183813 A1 | 7/2014 | Aoyama |
| 2014/0210157 A1 | 7/2014 | Aoyama |
| 2014/0319759 A1 | 10/2014 | Fujii et al. |
| 2015/0132039 A1 | 5/2015 | Tobinaga et al. |
| 2015/0251864 A1 | 9/2015 | Aoyama et al. |
| 2015/0259164 A1 | 9/2015 | Horita et al. |
| 2015/0274450 A1 | 10/2015 | Fujii et al. |
| 2015/0274452 A1 | 10/2015 | Tanaka et al. |
| 2015/0321863 A1 | 11/2015 | Aoyama |
| 2016/0109841 A1 | 4/2016 | Horita et al. |
| 2016/0334748 A1 | 11/2016 | Aoyama et al. |
| 2016/0378042 A1 | 12/2016 | Tanaka et al. |
| 2017/0115618 A1 | 4/2017 | Tobinaga et al. |
| 2017/0227911 A1 | 8/2017 | Kuno et al. |
| 2018/0127223 A1 | 5/2018 | Horita et al. |
| 2019/0039842 A1 | 2/2019 | Aoyama et al. |
| 2019/0225438 A1 | 7/2019 | Aoyama et al. |

\* cited by examiner

DRIVE TRANSMITTER, SHEET FEEDING DEVICE INCORPORATING THE DRIVE TRANSMITTER, AND IMAGE FORMING APPARATUS INCORPORATING THE DRIVE TRANSMITTER

CROSS-REFERENCE TO RELATED APPLICATION

This patent application is based on and claims priority pursuant to 35 U.S.C. § 119(a) to Japanese Patent Application No. 2018-182977, filed on Sep. 27, 2018, in the Japan Patent Office, the entire disclosure of which is hereby incorporated by reference herein.

BACKGROUND

Technical Field

This disclosure relates to a drive transmitter, a sheet feeding device including the drive transmitter, and an image forming apparatus including the drive transmitter.

Related Art

Various types of drive transmitters are known to include a first member having a pair of grooves spaced at an angle of 180 degrees in a rotational direction, and a second member having a pair of insertion portions provided at an angle of 180 degrees in the rotational direction to be inserted into the pair of grooves.

SUMMARY

At least one aspect of this disclosure provides a drive transmitter including a first unit and a second unit. The first unit includes a coupling portion having grooves, including a pair of grooves. The grooves are spaced at an angle of 180 degrees in a rotational direction of the first unit. The second unit has projections, including a pair of projections. The projections are spaced at an angle of 180 degrees in a rotational direction of the second unit. The projections are configured to be inserted into the grooves of the coupling portion. The coupling portion further has a guiding portion and a non-guiding portion. The guiding portion is sloped, with a height from a bottom face of the grooves decreasing in the rotational direction of the first unit. The guiding portion is configured to guide the projections of the second unit to the grooves of the coupling portion. The non-guiding portion is disposed at a point symmetrical position to the guiding portion with respect to an axial center of the first unit. One of the projections is not in contact with the non-guiding portion while another one of the projections, which is disposed opposite the one of the projections, is in contact with the guiding portion.

Further, at least one aspect of this disclosure provides a sheet feeding device including a conveyance body configured to convey a sheet, and the above-described drive transmitter configured to transmit driving force of a driving source to the conveyance body.

Further, at least one aspect of this disclosure provides an image forming apparatus including a drive source, a rotary body, and the above-described drive transmitter configured to transmit driving force of the driving source to the conveyance body.

BRIEF DESCRIPTION OF THE SEVERAL VIEWS OF THE DRAWINGS

An exemplary embodiment of this disclosure will be described in detail based on the following figured, wherein.

DETAILED DESCRIPTION

Figure 1:
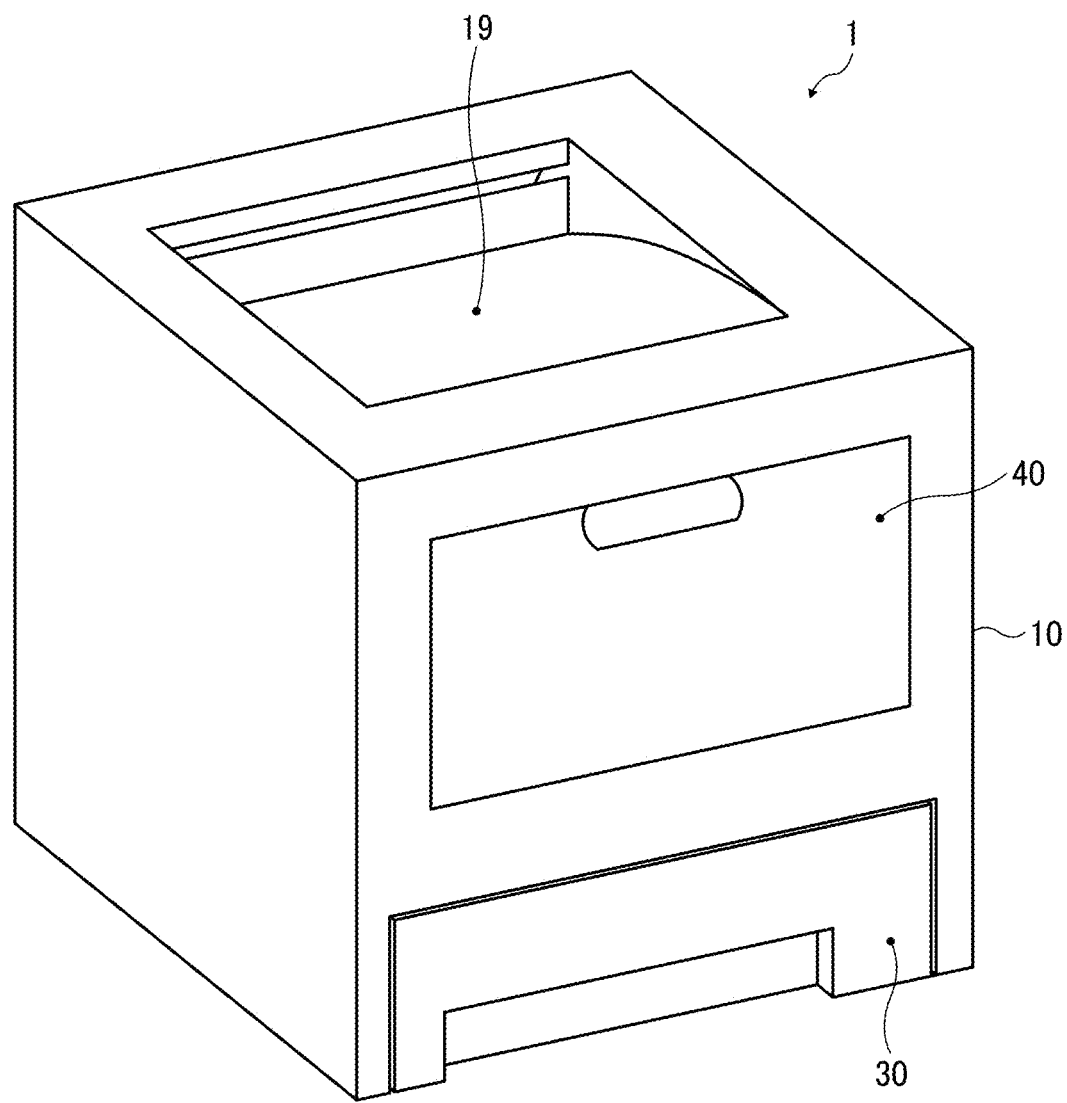
FIG. 1 is an external perspective view illustrating an example of an entire configuration of an image forming apparatus according to an embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of a drive transmitter, a sheet feeding device, and an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any drive transmitter and is implemented in the most effective manner in any electrophotographic image forming apparatus.

In describing preferred embodiments illustrated in the drawings, specific terminology is employed for the sake of clarity. However, the embodiment of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of an embodiment applicable to a drive transmitter, a sheet feeding device incorporating the drive transmitter, and an image forming apparatus incorporating the drive transmitter, with reference to the following figures.

It is to be noted that elements (for example, mechanical parts and components) having the same functions and shapes are denoted by the same reference numerals throughout the specification and redundant descriptions are omitted.

Hereinafter, a detailed description is given of an embodiment of this disclosure with reference to the drawings.

Figure 2:
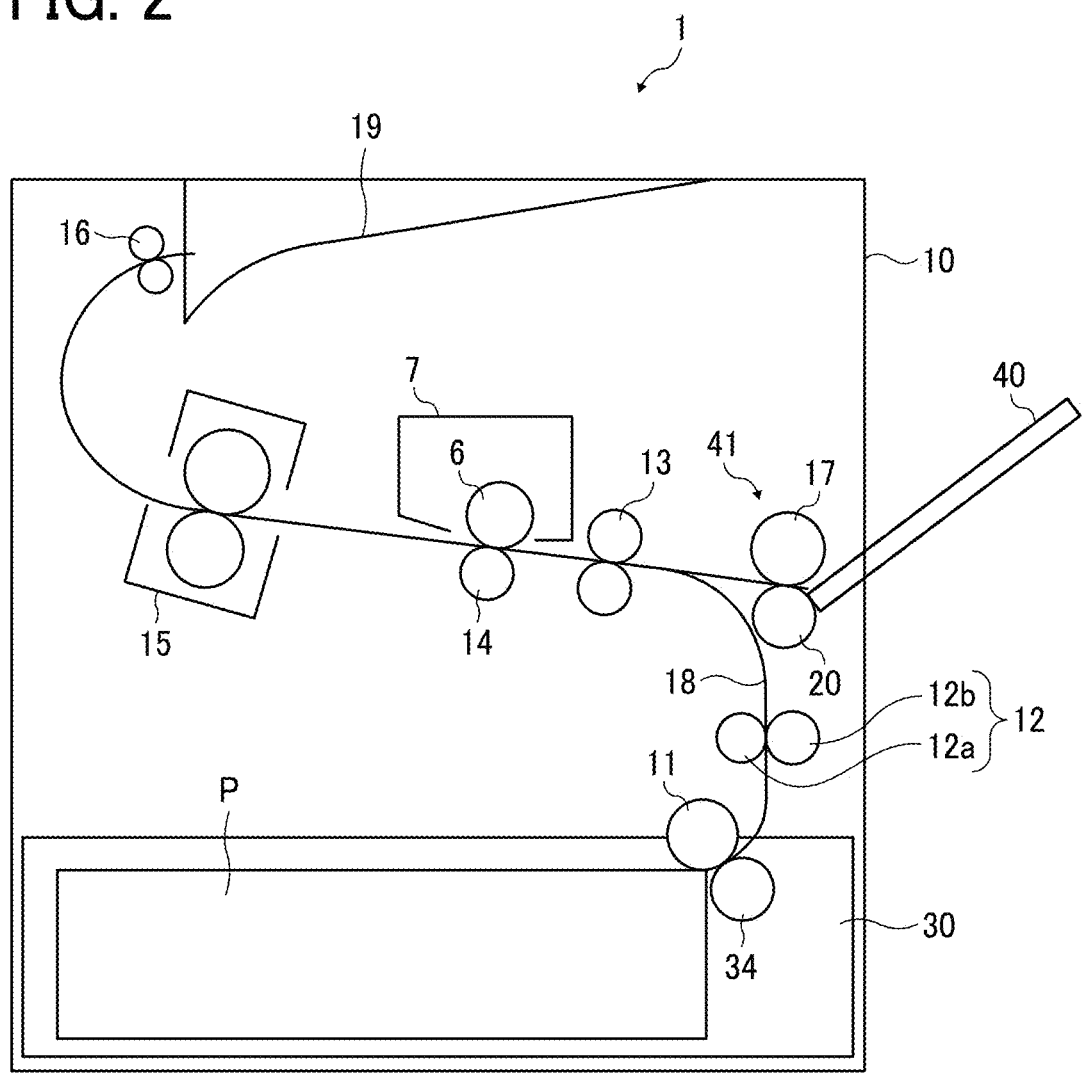
FIG. 2 is a cross-sectional view illustrating a schematic configuration of the image forming apparatus according to the present embodiment of this disclosure.

FIG. 1 is an external perspective view illustrating an example of an entire configuration of an image forming apparatus according to an embodiment of this disclosure. FIG. 2 is a cross-sectional view illustrating a schematic configuration of the image forming apparatus according to the present embodiment of this disclosure.

Further, size (dimension), material, shape, and relative positions used to describe each of the components and units are examples, and the scope of this disclosure is not limited thereto unless otherwise specified.

As illustrated in FIG. 1, an image forming apparatus 1 (for example, a laser printer in this specification) according to the present embodiment of this disclosure includes a sheet tray 30, a sheet ejection tray 19, and a bypass tray 40. The sheet tray 30 loads and contains a sheet bundle including a sheet P. The sheet ejection tray 19 stacks the sheet P that has been ejected from the inside of an apparatus body 10 of the image forming apparatus 1. The bypass tray 40 opens and closes with respect to apparatus body 10. The sheet tray 30 is provided to be drawable to the front side of the image forming apparatus 1 in FIG. 1.

The image forming apparatus 1 further includes a photoconductor 6, an image forming device 7, a transfer roller 14, and a fixing device 15. The photoconductor 6 functions as a latent image bearer on which a latent image is formed. The transfer roller 14 transfers a toner image that is developed from the latent image formed on a surface of the photoconductor 6, onto the sheet P. The fixing device 15 fixes the toner image transferred onto the sheet P, to the sheet P. The image forming device 7 includes a charging unit, an exposure unit, a developing unit, and a cleaning unit. The charging unit uniformly charges the surface of the photoconductor 6. The exposure unit irradiates laser light based on image data, to the surface of the photoconductor 6, so as to form a latent image on the surface of the photoconductor 6. The developing unit develops the latent image formed on the surface of the photoconductor 6, with toner, so as to visualize the latent image to a toner image. The cleaning unit removes residual toner remaining on the surface of the photoconductor 6 after the toner image has been transferred and cleans the surface of the photoconductor 6 for subsequent image formation.

Further, the image forming apparatus 1 includes a sheet feed roller 11 that functions as a rotary body. The sheet feed roller 11 is disposed at a lower part of the apparatus body 10. The sheet feed roller 11 also functions as a conveyance body to convey a sheet P. The sheet feed roller 11 applies conveying force to the sheet P that has been contained in the sheet tray 30 in which the sheet bundle including the sheet P is contained. A sheet separation roller 34 is also disposed below the apparatus body 10 of the image forming apparatus 1. The sheet separation roller 34 is disposed to contact the sheet feed roller 11. Furthermore, the image forming apparatus 1 includes a bypass sheet feed roller 17 and a bypass sheet separation roller 20. The bypass sheet feed roller 17 applies conveying force to the sheet P loaded on the bypass tray 40. The bypass sheet separation roller 20 contacts the bypass sheet feed roller 17.

When an image is formed by the image forming apparatus 1, the charging unit included in the image forming device 7 uniformly charges the surface of the photoconductor 6, and the exposure unit included in the image forming device 7 forms a latent image on the charged surface of the photoconductor 6. Then, the developing unit included in the image forming device 7 develops the latent image formed on the surface of the photoconductor 6, so that a toner image is formed on the surface of the photoconductor 6.

In a case in which an image is formed on the sheet P that is contained in the sheet tray 30, the sheet feed roller 11 that is rotated by a drive source feeds the sheet P from the sheet tray 30, so that the sheet P enters a separation nip region formed between the sheet feed roller 11 and the sheet separation roller 34.

The sheet separation roller 34 is rotated along with rotations of the sheet feed roller 11 and movement of the sheet P in the sheet separation nip region. Further, the sheet separation roller 34 is rotatably supported by a torque limiter. In a case in which the sheet P is not in the sheet separation nip region or in a case in which a single sheet P is entered in the sheet separation nip region, relatively large driving force of the sheet feed roller 11 is applied to the sheet separation roller 34. According to this arrangement, torque of driven rotation of the sheet separation roller 34 exceeds a predetermined threshold, and therefore the torque limiter allows the driven rotation of the sheet separation roller 34. That is, when the sheet P is not in the sheet separation nip region or when a single sheet P is entered in the sheet separation nip region, the sheet separation roller 34 is rotated along with the sheet feed roller 11.

On the other hand, when a plurality of sheets P overlapping one upon another has entered the sheet separation nip region due to multiple feeding, a relatively strong conveying force is applied to the uppermost sheet P in direct contact with the sheet feed roller 11 at the sheet separation nip region. Thus, the uppermost sheet P is conveyed in a sheet conveying direction. The sheets P other than the uppermost sheet P are pressed in the sheet separation nip region to receive a conveyance resistance. When the conveyance resistance exceeds the frictional resistance between the uppermost sheet P and the second uppermost sheet P, slippage occurs between the sheets, in other words, the sheet P slips on the subsequent sheet P. Then, this slippage causes the torque of rotation of the sheet separation roller 34 together with rotation of the sheet feed roller 11, to be equal to or less than the predetermined threshold. Therefore, the torque limiter no longer allows the sheet separation roller 34 to rotate with the sheet feed roller 11. As a result, the conveyance resistance to the second uppermost sheet P and the subsequent sheets P further increases to stop movement of the second uppermost sheet P and the subsequent sheets P. Thus, the sheet separation roller 34 separates the other sheets P from the uppermost sheet P while applying the conveyance resistance to the plurality of sheets P.

A sheet P1 separated into a single sheet in the sheet separation nip region reaches a sheet conveyance passage 18, and a pair of sheet conveying rollers 12 including two sheet conveying rollers 12a and 12b conveys the separated sheet P1 to a position at which the sheet P1 contacts a pair of registration rollers 13.

When an image is formed on a sheet P placed on the bypass tray 40, a sheet fed from the bypass tray 40 by the bypass sheet feed roller 17 rotationally driven by the drive source enters a bypass separation nip region between the bypass sheet feed roller 17 and the bypass sheet separation roller 20. Similar to the sheet separation roller 34, the bypass sheet separation roller 20 is rotatably supported by the torque limiter, and is driven to rotate along with rotations of the sheet feed roller 11 or movement of the sheet P in the sheet separation nip region. Accordingly, similarly to the above description, when a plurality of sheets has been conveyed to the bypass separation nip region, the torque limiter restricts rotations of the bypass sheet separation roller, and the other sheets are separated from the uppermost sheet P.

Then, the pair of registration rollers 13 rotationally drives in synchronization with the timing at which the toner image formed on the surface of the photoconductor 6 reaches a transfer position opposed to the transfer roller 14, and the toner image formed on the surface of the photoconductor 6 is transferred on the surface of the sheet P at the transfer position. The toner image transferred onto the sheet P is fixed by application of heat and pressure in the fixing device 15. Then, a pair of sheet ejection rollers 16 ejects the fixed sheet P to the sheet ejection tray 19 outside the image forming apparatus 1.

An outer circumferential surface of the sheet feed roller 11 that is to contact with a sheet P generally includes a high-friction member such as a rubber material. Thus, the surface of the sheet feed roller 11 is worn out due to printing a large number of sheets, and the conveyance performance is likely to be deteriorated. Therefore, the sheet feed roller 11 is configured to be replaceable to maintain the conveyance ability up to the lifespan of the image forming apparatus 1.

Figure 3A:
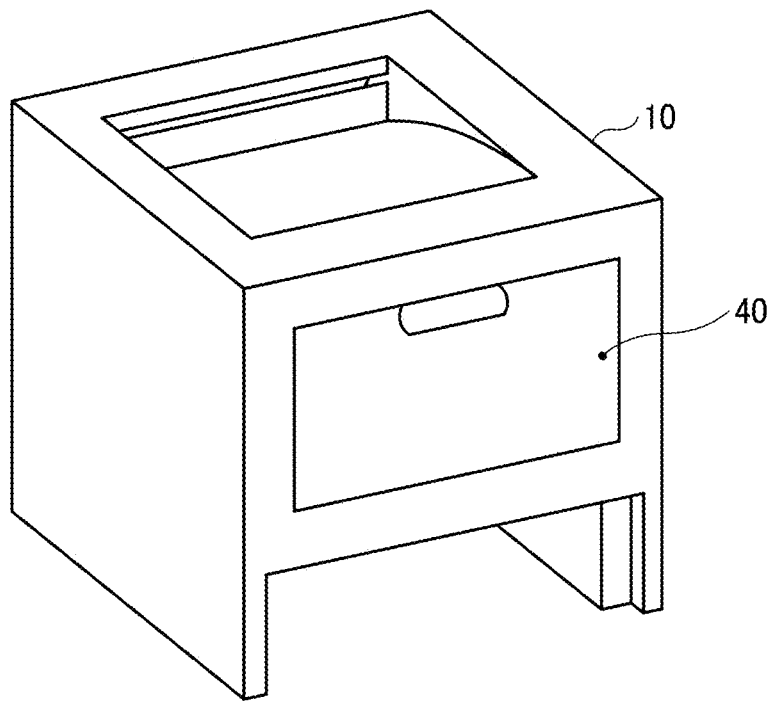
FIG. 3A is an external perspective view illustrating the image forming apparatus, viewed from a diagonally upward direction, with a sheet tray being removed from an apparatus body of the image forming apparatus.
Figure 3B:
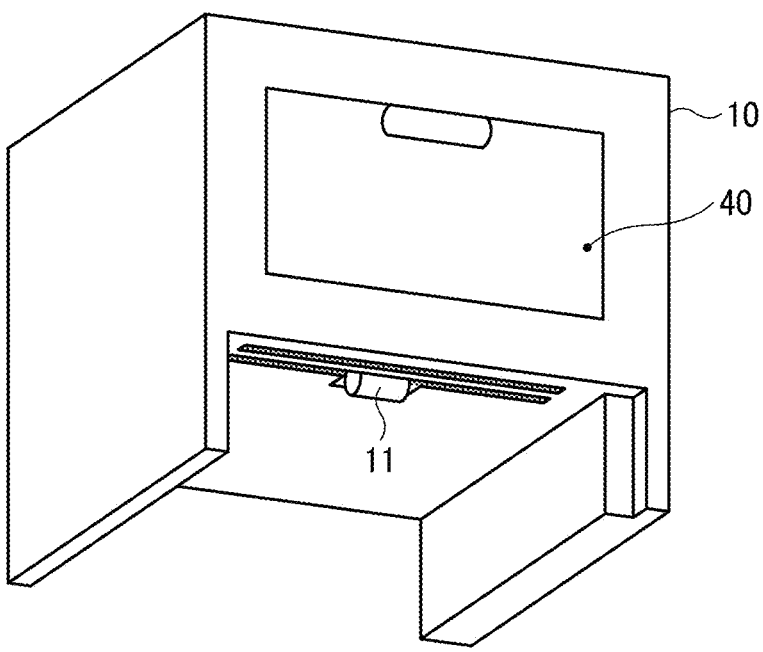
FIG. 3B is an external perspective view illustrating the image forming apparatus, viewed from a diagonally downward direction, with the sheet tray being removed from the apparatus body of the image forming apparatus.

FIG. 3A is an external perspective view illustrating the image forming apparatus 1, viewed from a diagonally upward direction, with the sheet tray 30 being removed from the apparatus body 10 of the image forming apparatus 1. FIG. 3B is an external perspective view illustrating the image forming apparatus 1, viewed from a diagonally downward direction, with the sheet tray 30 being removed from the apparatus body 10 of the image forming apparatus 1.

As illustrated in FIGS. 3A and 3B, the image forming apparatus generally has a sheet feeding unit provided at a lower portion of the image forming apparatus. Thus, the sheet feed roller 11 is difficult to visually recognize even with the sheet tray 30 being detached. As a result, when replacing the sheet feed roller 11, an operator or a user looks into the image forming apparatus 1 from below to access the sheet feed roller 11, which makes the replacement work difficult.

Figure 4:
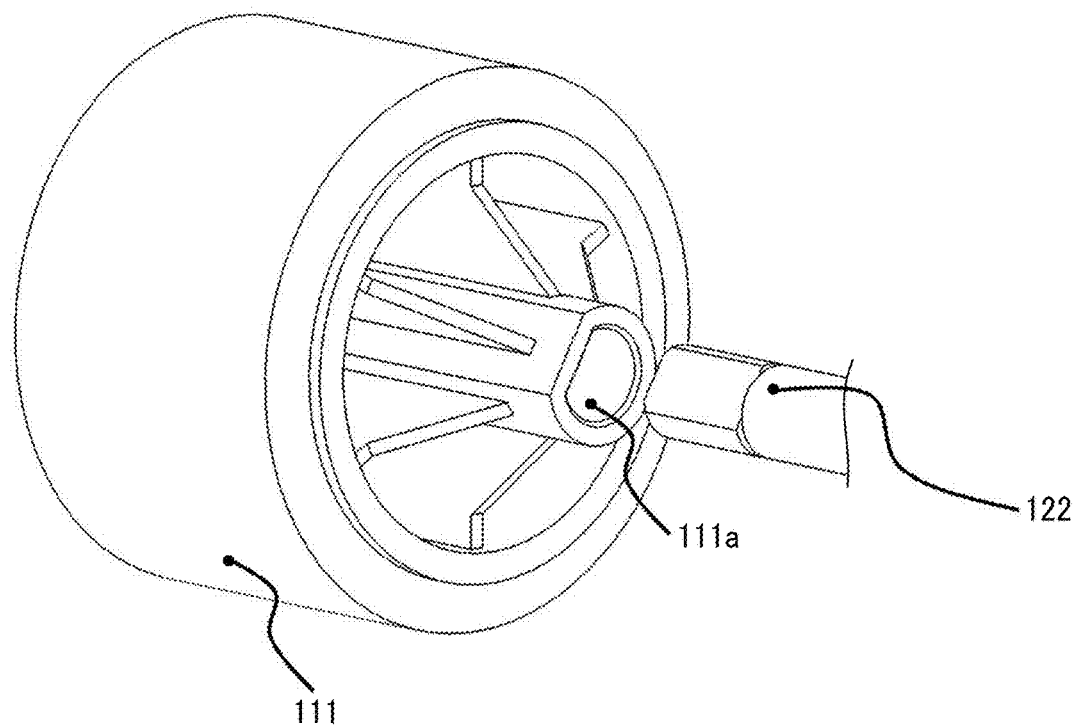
FIG. 4 is a perspective view illustrating an example of a comparative sheet feed roller.

FIG. 4 is a perspective view illustrating an example of a comparative sheet feed roller 111.

As illustrated in FIG. 4, the comparative sheet feed roller 111 has a shaft insertion hole 111a with a D-cut shape in cross section. An end with an engagement shape (that is, the D-cut shape in cross section in the example of FIG. 4) of a drive shaft is insertable into the shaft insertion hole 111a. When the comparative sheet feed roller 111 is assembled to a drive shaft 122, the axial center of the shaft insertion hole 111a of the comparative sheet feed roller 111 is aligned with the axial center of the drive shaft 122, and the shaft insertion hole 111a is aligned with the engagement shape of the end of the drive shaft 122 in a rotational direction. Then, the comparative sheet feed roller 111 is moved relatively to the drive shaft 122 in the axial direction, and the end of the drive shaft 122 is inserted into the shaft insertion hole 111a to attach the comparative sheet feed roller 111. The attachment of the comparative sheet feed roller 111 to the drive shaft 122 in such a manner has made replacement work for the comparative sheet feed roller 111 difficult. Furthermore, poor visual recognition has made the replacement work more difficult. Due to such poor visual recognition, there is a case that in spite of improper engagement of an engaging portion between the comparative sheet feed roller 111 and the drive shaft 122, the worker determines that the comparative sheet feed roller 111 has been assembled to the drive shaft 122. In this case, the comparative sheet feed roller 111 does not rotationally drive and a sheet is not fed. As a result, a trouble such as paper jam may occur.

Therefore, in the present embodiment, the comparative sheet feed roller 111 as a first unit is easily and properly assembled to the drive shaft 122 as a second unit.

Figure 5:
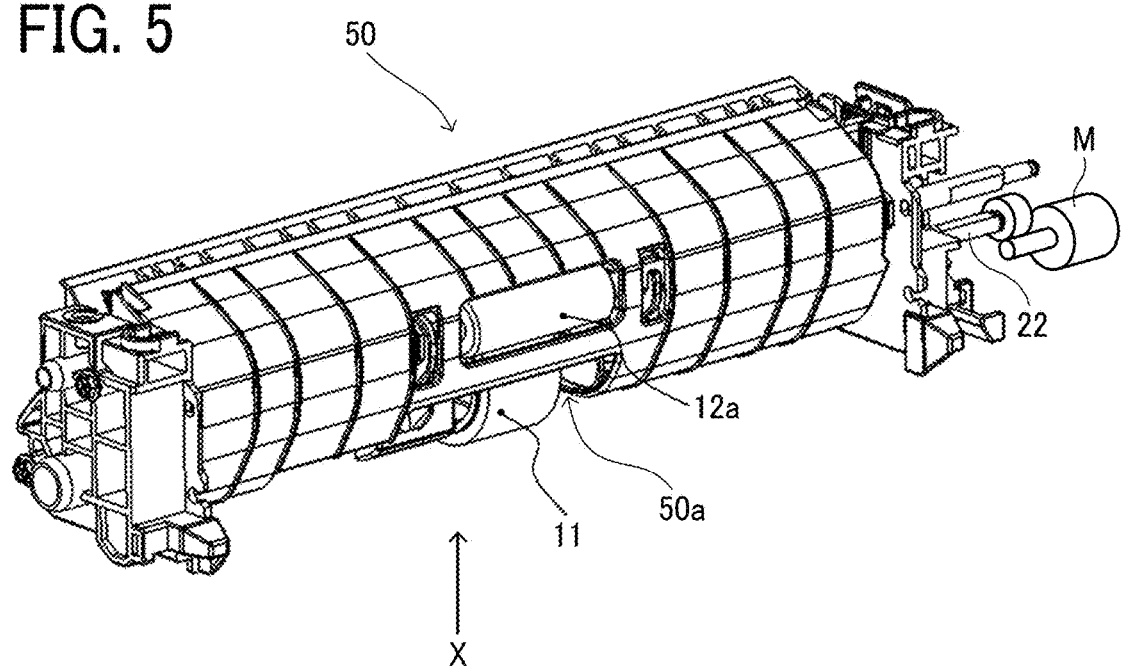
FIG. 5 is a perspective view illustrating a sheet feeding unit.
Figure 6:
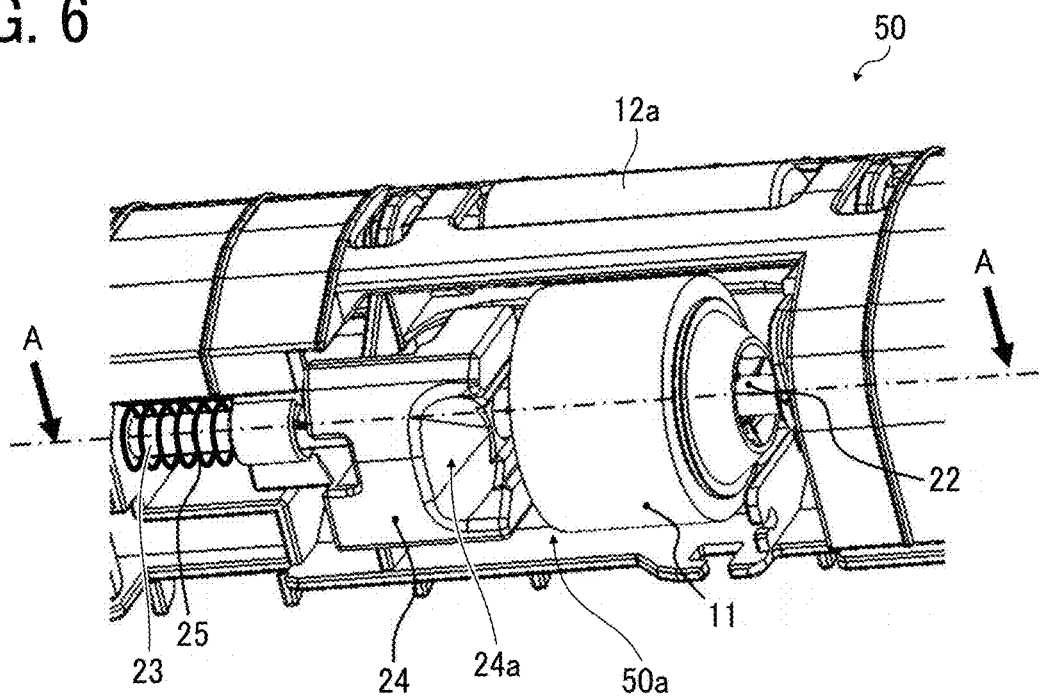
FIG. 6 is an enlarged view illustrating an area around a sheet feed roller, viewed from an X direction of FIG. 5.
Figure 7:
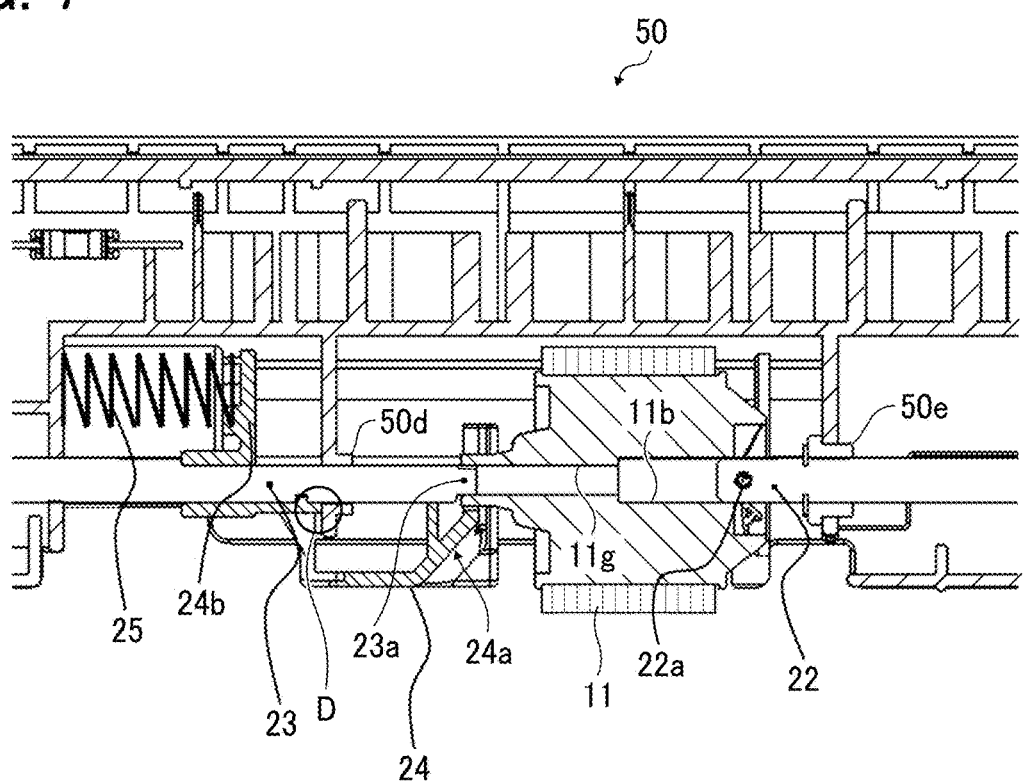
FIG. 7 is a cross sectional view illustrating the sheet feeding unit, along a line A-A of FIG. 6.
Figure 8:
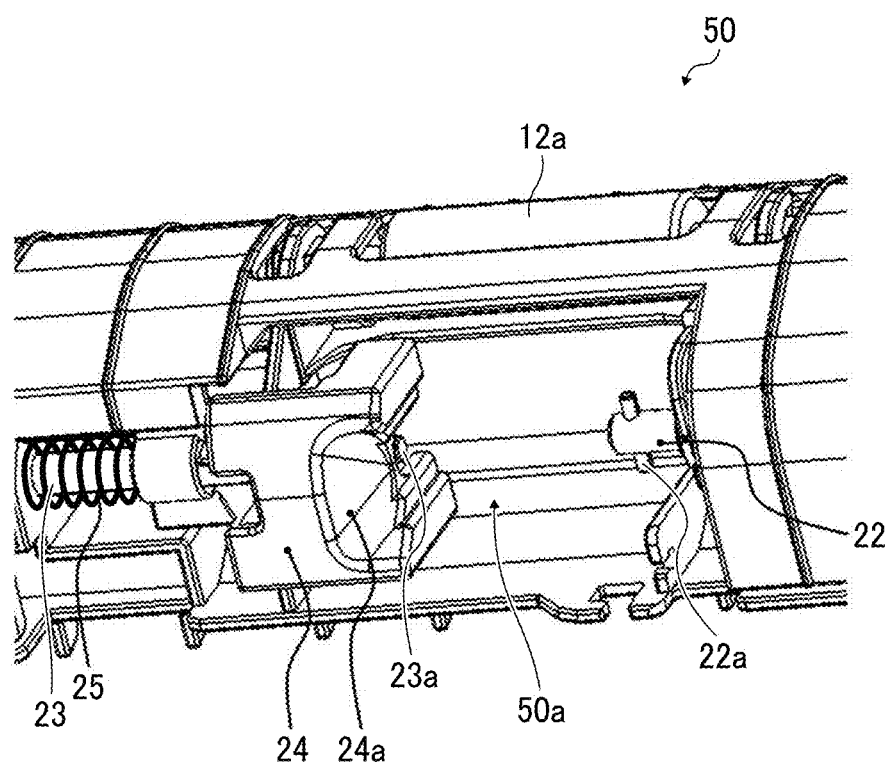
FIG. 8 is a diagram illustrating the sheet feeding unit with the sheet feed roller being removed.

FIG. 5 is a perspective view illustrating a sheet feeding unit 50. FIG. 6 is an enlarged view illustrating an area around the sheet feed roller 11, viewed from an X direction of FIG. 5. FIG. 7 is a cross sectional view illustrating the sheet feeding unit 50, along a line A-A of FIG. 6. FIG. 8 is a diagram illustrating the sheet feeding unit 50 with the sheet feed roller 11 being removed.

As illustrated in FIG. 5, the sheet feeding unit 50 that functions as a drive transmitter rotatably supports the sheet feed roller 11 and the sheet conveying roller 12a. The sheet feed roller 11 functions as a conveyance body to convey a sheet P. The sheet conveying roller 12a is one of the pair of sheet conveying rollers 12.

The sheet feed roller 11 that functions as a first unit is housed in a sheet feed roller housing portion 50a provided at a substantially center in the axial direction of the sheet feeding unit 50 that functions as a drive transmitter. As illustrated in FIG. 7, the sheet feed roller 11 is retained and supported by a sliding shaft 23 axially slidably supported by the sheet feeding unit 50 and a drive shaft 22 that functions as a second unit.

A roller support portion 23a is formed at the leading end of the sliding shaft 23. The roller support portion 23a is smaller in diameter than the sliding shaft 23 and rotatably supports one side in the axial direction of the sheet feed roller 11. A guide 24 is fixed to the sliding shaft 23. When replacing a sheet feed roller 11 whose service life is out to a new sheet feed roller 11, the guide 24 guides the new sheet feed roller 11 to the sheet feed roller housing portion 50a. The guide 24 has a guide portion 24a with a substantially mortar shape and a spring receiving portion. The guide portion 24a guides the leading end of a second supporting hole 11g into which the roller support portion 23a of the sheet feed roller 11 is inserted, to the roller support portion 23a. One end of a pressure spring 25 that functions as a biasing body contacts the spring receiving portion.

The pressure spring 25 biases the sliding shaft 23 toward the drive shaft 22 via the guide 24. As illustrated in FIG. 7, when the sheet feed roller 11 is supported by the sliding shaft 23 and the drive shaft 22, as illustrated in D in the figure, part of the guide 24 contacts a supporting wall 24b of a casing of the sheet feeding unit 50, the supporting wall 24b slidably supporting the sliding shaft 23. Thus, movement of the sliding shaft 23 to the drive shaft 22 side due to a biasing force of the pressure spring 25 is restricted.

The drive shaft 22 is rotatably supported by the sheet feeding unit 50 via a bearing 50e. The leading end of the drive shaft 22 is inserted into a first supporting hole 11b of the sheet feed roller 11. A drive pin 22a provided near the leading end of the drive shaft 22 is fitted in the grooves 11a of a coupling portion 100 of the sheet feed roller 11 described later. With this arrangement, driving force is transmitted to the sheet feed roller 11 via the drive pin 22a of the drive shaft 22 to rotationally drive the sheet feed roller 11.

Figure 9:
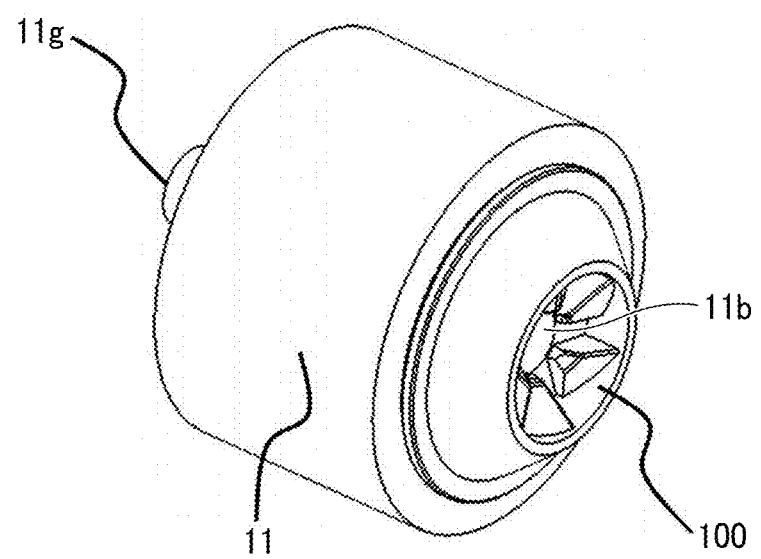
FIG. 9 is a perspective view illustrating the sheet feed roller.

FIG. 9 is a perspective view illustrating the sheet feed roller 11.

As illustrated in FIG. 9, the coupling portion 100 to connect a driving connection to with the drive shaft 22 is provided on the side of the drive shaft 22, which functions as a second unit, of the sheet feed roller 11 that functions as a first unit.

Figure 10B:
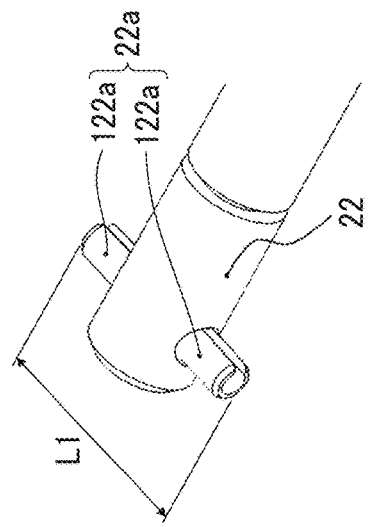
FIG. 10B is a perspective view illustrating a leading end of a drive shaft.
Figure 10C:
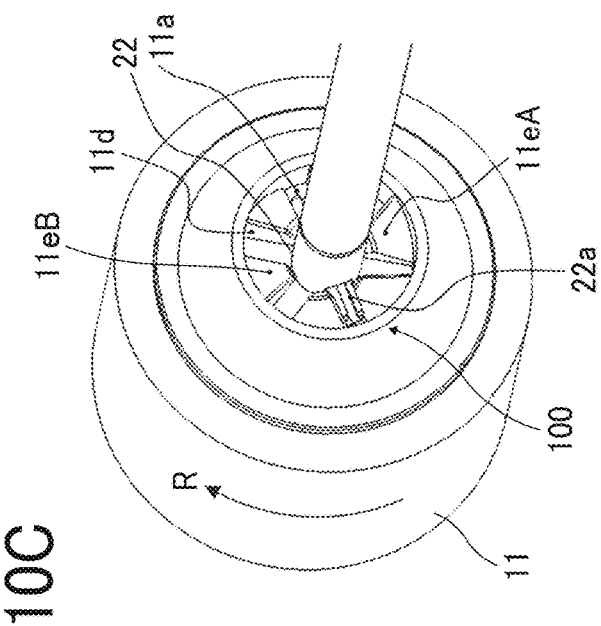
FIG. 10C is a view illustrating a state in which the sheet feed roller and the drive shaft are drivingly coupled to each other.
Figure 10A:
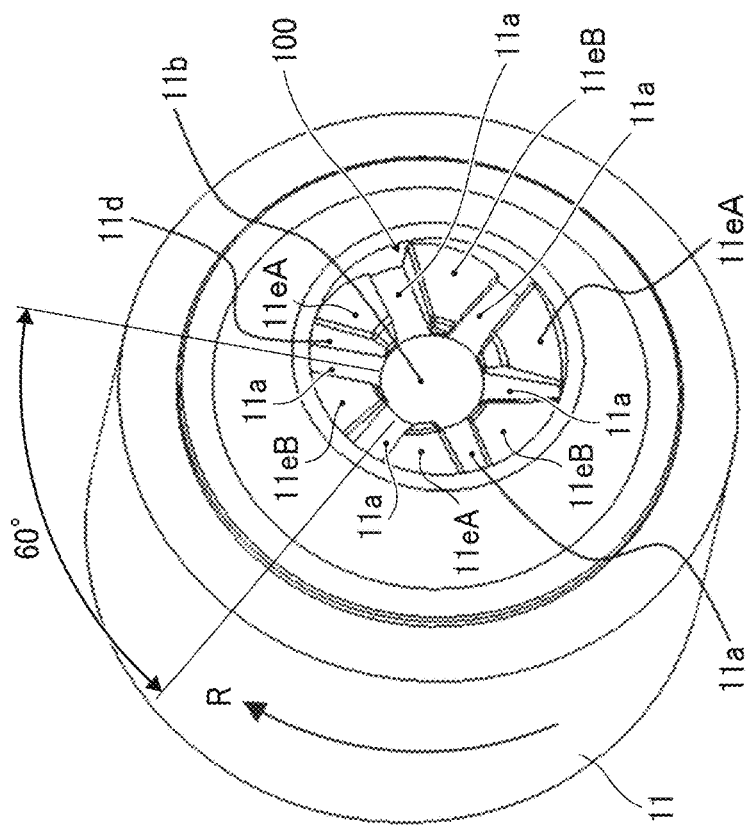
FIG. 10A is a perspective view illustrating a configuration of a coupling portion of the sheet feed roller.

FIG. 10A is a perspective view illustrating the configuration of the coupling portion 100 of the sheet feed roller 11. FIG. 10B is a perspective view illustrating the leading end of the drive shaft 22. FIG. 10C is a view illustrating a state in which the sheet feed roller 11 and the drive shaft 22 are drivingly coupled to each other.

As illustrated in FIG. 10A, a sidewall perpendicular to the axial direction on the drive shaft 22 side of the sheet feed roller 11 has the coupling portion 100 to couple with the drive pin 22a of the drive shaft 22, provided at the sidewall. The first supporting hole 11b that functions as a rotation axis is formed at a central portion of the coupling portion 100. The leading end of the drive shaft 22 is inserted into the first supporting hole 11b. The inner diameter of the first supporting hole 11b is larger than the outer diameter of the leading end of the drive shaft 22.

Furthermore, the coupling portion 100 has six grooves 11a, each of which extends radially from the first supporting hole 11b, in other words, from the axial center O of the sheet feed roller 11. The six grooves 11a are disposed spaced at an angle of 60 degrees in the rotational direction of the sheet feed roller 11. The six grooves 11a form three pairs of grooves 11a. The grooves 11a of each pair are spaced at an angle of 180 degrees in the rotational direction. Each of the widths of the grooves 11a is larger than the diameter of the drive pin 22a such that the sheet feed roller 11 is easily removed from the drive shaft 22. Such an arrangement enhances the replaceability of the sheet feed roller 11.

The six grooves 11a are disposed at equally spaced intervals in the present embodiment. However, when even numbers of grooves 11a are spaced at equal intervals, each pair of grooves 11a is spaced at an angle of 180 degrees in the rotational direction of the sheet feed roller 11.

The coupling portion 100 further has guiding portions 11eA and non-guiding portions 11eB. The guiding portions 11eA and the non-guiding portions 11eB are alternately provided between the grooves 11a of the coupling portion 100. When the drive pin 22a and the grooves 11a are misaligned in position in the rotational direction, the drive pin 22a is brought to contact the guiding portion 11eA and the guiding portion 11eA guides the drive pin 22a to the pair of grooves 11a, and the non-guiding portion 11eB does not come in contact with the drive pin 22a. The non-guiding portion 11eB is located at a position rotated by 180 degrees in the rotational direction from the guiding portion 11eA (i.e., a position symmetric with respect to a point about the axial center O to the guiding portion 11eA).

The guiding portion 11eA and the non-guiding portion 11eB each are sloped as the height with respect to the bottom faces of the grooves 11a gradually decreases, from the upstream side to the downstream side of the rotational drive direction (indicated by arrow R in the figure) of the sheet feed roller 11.

As illustrated in FIG. 10B, the drive pin 22a penetrates through the drive shaft 22 at a position slightly lower than the leading end of the drive shaft 22. According to the present embodiment, the drive pin 22*a* is a spring pin. However, the drive pin 22*a* may be a parallel pin. According to the present embodiment, a length L of the drive pin 22*a* extends from a first end to a second end of the drive pin 22*a*. The length L is shorter than the inner diameter of the coupling portion 100. Portions of the drive pin 22*a*, which project from the outer circumference of the drive shaft 22 and disposed spaced at an angle of 180 degrees in the rotational direction, form drive transmission portions 122*a*, each functioning as a projection (in other words, an insertion portion) that transmits a driving force to the sheet feed roller 11.

As illustrated in FIG. 10C, a pair of drive transmission portions 122*a*, which functions as a pair of projections (i.e., insertion portions) of the drive pin 22*a* and projects from the outer circumferential face of the drive shaft 22, is inserted into and fitted in a pair of grooves 11*a* spaced at an angle of 180 degrees in the rotational direction to drivingly connect the drive pin 22*a* and the sheet feed roller 11. When the sheet feed roller 11 drives in a direction indicated by arrow R in the figure, the drive transmission portions 122*a* of the drive pin 22*a* contact the wall face 11*d* of the groove 11*a* on the downstream side in the rotational drive direction. Thus, the driving force is transmitted to from the drive pin 22*a* to drive to rotate the sheet feed roller 11.

Next, a detailed description is given of the coupling portion 100.

Figure 11:
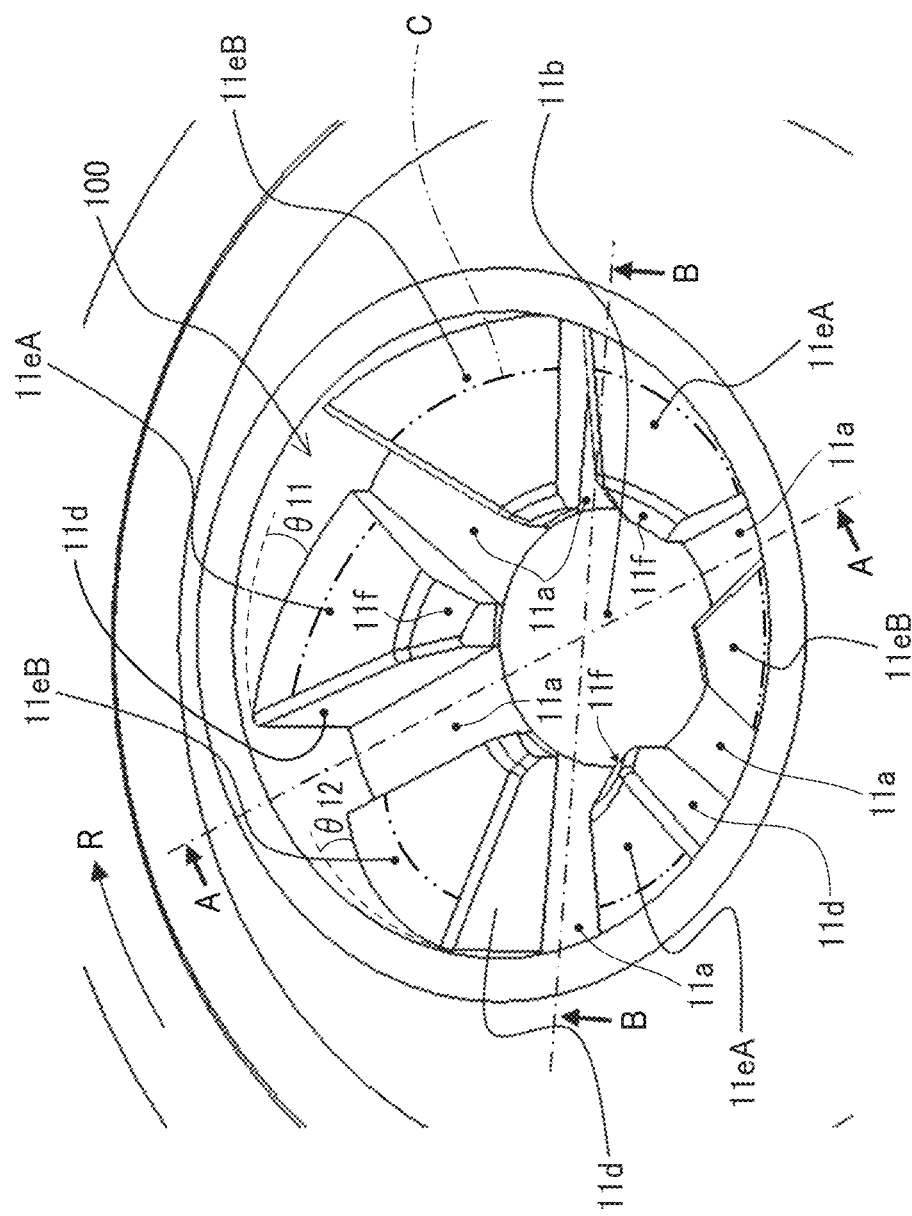
FIG. 11 is a perspective view illustrating the coupling portion.
Figure 12A:
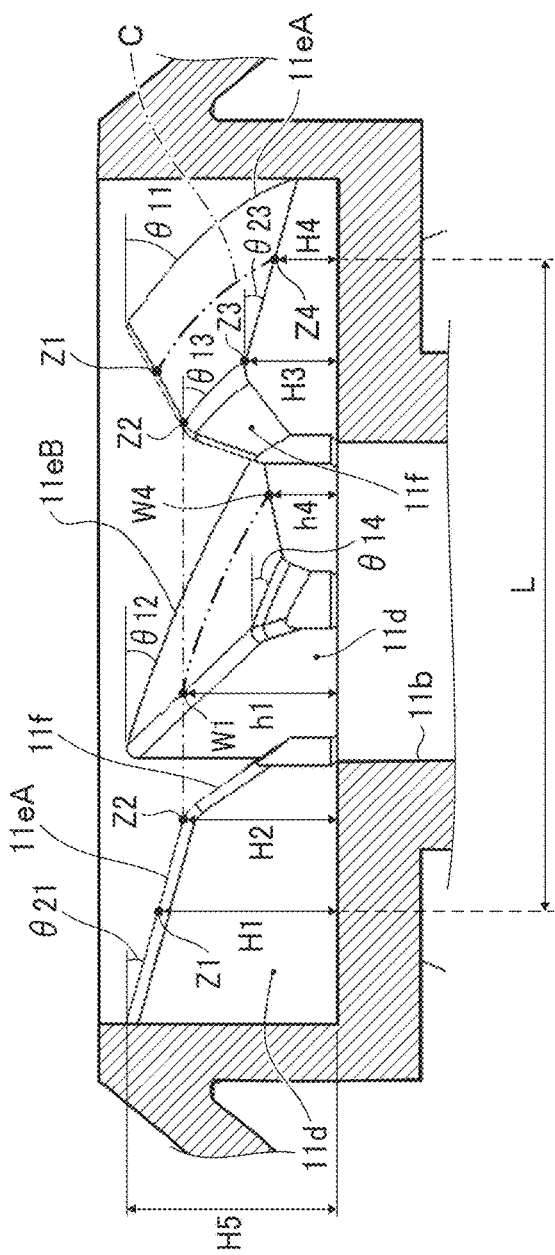
FIG. 12A is a cross-sectional view illustrating the coupling portion of FIG. 11, along a line A-A in FIG. 11.
Figure 12B:
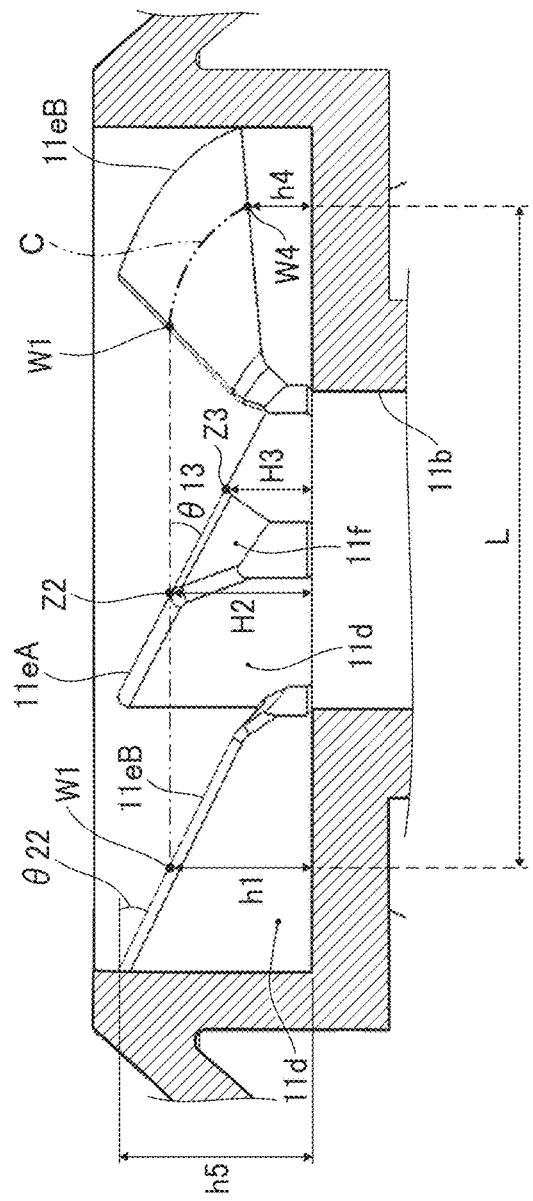
FIG. 12B is a cross-sectional view of the coupling portion of FIG. 11, along a line B-B in FIG. 11.

FIG. 11 is a perspective view illustrating the coupling portion 100. FIG. 12A is a cross-sectional view illustrating the coupling portion 100 of FIG. 11, along a line A-A in FIG. 11. FIG. 12B is a cross-sectional view of the coupling portion 100 of FIG. 11, along a line B-B in FIG. 11.

As illustrated in FIGS. 11 and 12A, the slope angle of the guiding portion 11*e*A on an axial center O side in the rotational drive direction is different from the slope angle of the guiding portion 11*e*A on the outer side in the rotational drive direction. The slope angle θ11 of the guiding portion 11*e*A on the outer side is larger than the slope angle θ13 of the guiding portion 11*e*A on the axial center O side.

Furthermore, as illustrated in FIG. 12A, the upstream end in the rotational drive direction of the guiding portion 11*e*A has a slope gradually decreasing in height with respect to the bottom faces of the grooves 11*a* toward the axial center O (slope angle θ21). On the other hand, the downstream end in the rotational drive direction of the guiding portion 11*e*A has a slope gradually increasing with respect to the bottom faces of the grooves 11*a* toward the axial center O (the slope angle θ23). That is, the face of the guiding portion 11*e*A facing the drive pin 22*a* is shaped twisting in the axial direction. Thus, the face of the guiding portion 11*e*A has a shape such that the position at the maximum height with respect to the bottom faces of the grooves at each position in the rotational direction of the guiding portion 11*e*A varies to the axial center O side toward the rotational drive direction.

Similar to the guiding portion 11*e*A, the non-guiding portion 11*e*B on which the drive pin 22*a* does not contact has slope angles in the rotational drive direction different between the axial center O side and the outer side. The slope angle θ12 in the rotational drive direction on the outer side is larger than the slope angle θ14 in the rotational drive direction on the axial center O side (see FIGS. 11 and 12A). However, different from the guiding portion 11*e*A, the downstream end in the rotational drive direction of the non-guiding portion 11*e*B has a slope gradually decreasing in height with respect to the bottom faces of the grooves 11*a* toward the axial center O as well as the upstream end in rotational drive direction of the non-guiding portion 11*e*B. Thus, the non-guiding portion 11*e*B has a slope gradually decreasing in height with respect to the bottom faces of the grooves 11*a* toward the axial center O, at any position in the rotational direction. As a result, the position of the maximum height with respect to the bottom faces of the grooves 11*a* at each position in the rotational direction of the non-guiding portion 11*e*B is generally located at the position farthest from the axial center O.

In addition, the slope angle θ21 of the upstream end of the rotational drive direction of the guiding portion 11*e*A toward the axial center O (see FIG. 12A) is smaller than the slope angle θ22 of the upstream end of the rotational drive direction of the non-guiding portion 11*e*B toward the axial center O (see FIG. 12B).

The length L1 of the drive pin 22*a* extends from the first end to the second end of the drive pin 22*a*, and the length L1 is shorter than the inner diameter of the coupling portion 100. Thus, as illustrated in FIGS. 11, 12A, and 12B, an area of the guiding portion 11*e*A and an area of the non-guiding portion 11*e*B, both are opposing areas facing the drive pin 22*a*, are located inside in respective broken lines C in the figures.

As illustrated in FIGS. 12A and 12B, the height H5, from the groove 11*a*, of the outer end of the upstream end in the rotational drive direction of the guiding portion 11*e*A is substantially the same as the height h5 from the groove 11*a* of the outer end of the upstream end in the rotational drive direction of the non-guiding portion 11*e*B. The non-guiding portion 11*e*B, however, is larger than the guiding portion 11*e*A in slope angle toward the axial center O (θ22>θ21). As a result, the guiding portion 11*e*A is higher than the non-guiding portion 11*e*B in the maximum height, from the bottom face of the groove, in the area facing or opposed to the drive pin 22*a* of the upstream end of the rotational drive direction (H1>h1).

As can be seen from FIG. 12B, the maximum height h1 from the bottom face of the groove 11*a* in the area facing or opposed to the drive pin 22*a* of the upstream end in the rotational drive direction of the non-guiding portion 11*e*B is the substantially the same as the height H2 of the axial center O side end at the upstream end in the rotational drive direction of the guiding portion 11*e*A.

A height H3 is a height at the axial center O side end of the guiding portion 11*e*A at the downstream end of the rotational drive direction. A height H is a height at the outer end of the guiding portion 11*e*A in the area facing or opposed to the drive pin 22*a* at the downstream end of the rotational drive direction. A height h4 is a height at the outer end of the non-guiding portion 11*e*B in the area facing or opposed to the drive pin 22*a*, at the downstream end in the rotational drive direction. The height H4 of the outer end of the guiding portion 11*e*A in the area opposed to the drive pin 22*a*, at the downstream end in the rotational drive direction, is higher than the height h4 of the outer end of the non-guiding portion 11*e*B in the area opposed to the drive pin 22*a*, at the downstream end in the rotational drive direction.

A shaft guide 11*f* is provided on the axial center O side with respect to the guiding portion 11*e*A. The shaft guide 11*f* contacts or abuts on the tip end of the drive shaft 22 to guide the tip end of the drive shaft 22 into the first supporting hole 11*b*. The shaft guide 11*f* has a sloped face gradually decreasing in height with respect to the bottom faces of the grooves toward the axial center O.

Figure 13:
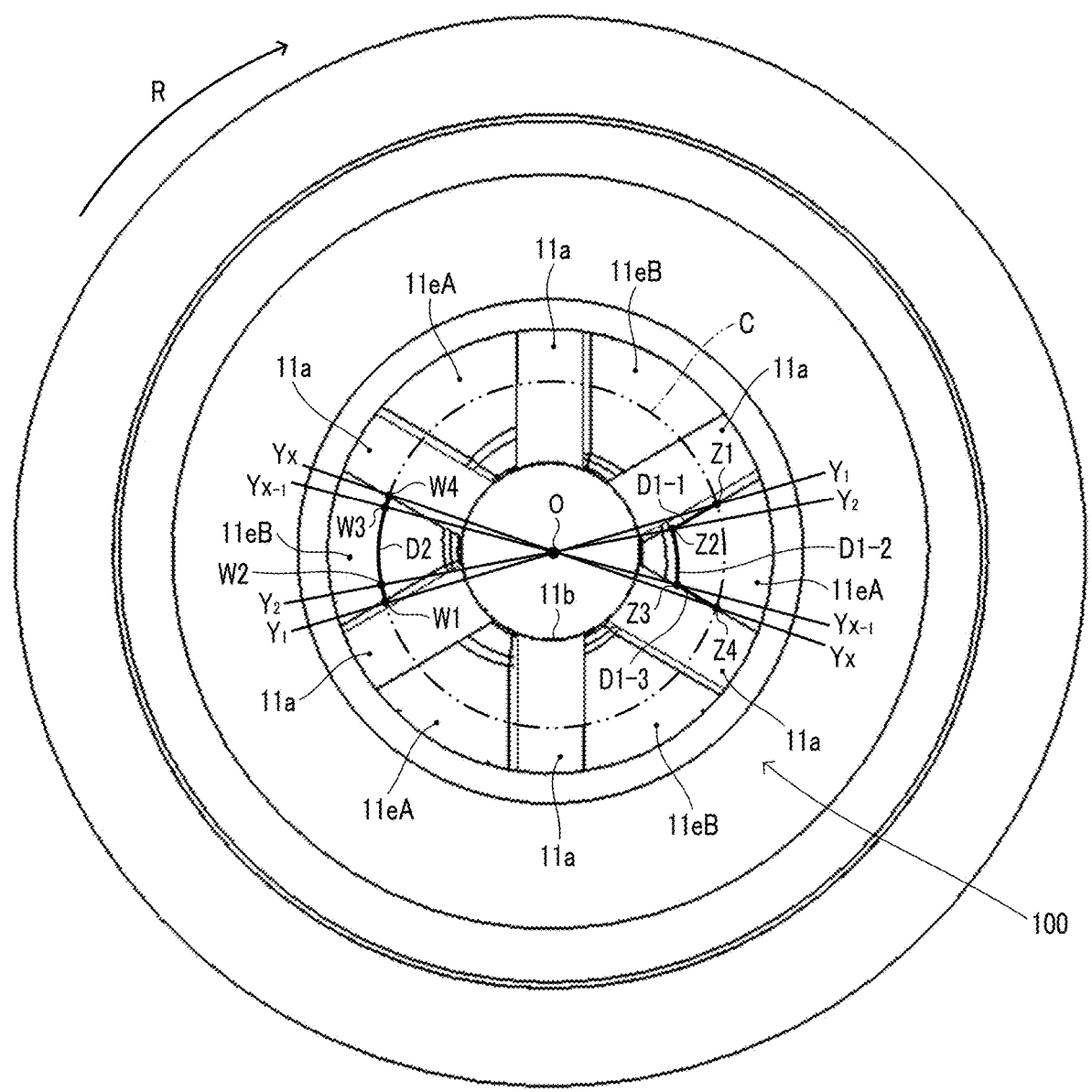
FIG. 13 is a diagram illustrating the coupling portion, viewed from an axial direction of the sheet feed roller.

FIG. 13 is a diagram illustrating the coupling portion 100, viewed from an axial direction of the sheet feed roller 11.

According to the present embodiment, in the area opposed to the drive pin 22a inside the broken line C in the figure, on any of straight lines Y1 to Yx passing through on the guiding portion 11eA and the non-guiding portion 11eB, and the axial center O of the coupling portion 100, the location maximum in height with respect to the grooves 11a on the straight lines exists generally on the guiding portion 11eA side.

The position maximum in height on each straight line at the guiding portion 11eA is the location of the outer end Z1, in the area opposed to the drive pin 22a, of the upstream end in the rotational drive direction, on the straight line Y1, and the height H1 is from the bottom face of the groove 11a. Between the straight line Y1 and the straight line Y2, the maximum height of the guiding portion 11eA on the straight lines is located at the upstream end in the rotational drive direction (D1-1 in the figure). In addition, the location maximum in height varies to the axial center O side toward the straight line Y2. The maximum height of the guiding portion 11eA on the straight line Y2 is located at the axial center side end Z2 at the upstream end in the rotational drive direction, and the height is H2.

Next, between the straight line Y2 and the straight line Yx-1, the maximum height of the guiding portion 11eA is located at the axial center side end (D1-2 in the figure).

The maximum height of the guiding portion 11eA on the straight line Yx-1 is located at the axial center side end Z3 at the downstream end of the rotational drive direction, and the height is H3. Next, between the straight line Yx-1 and the straight line Yx, the position maximum in height of the guiding portion 11eA on the straight lines is at the downstream end of the rotational drive direction (D1-3 in the figure). The location maximum in height varies to the side opposite the axial center O side toward the straight line Yx. On the straight line Yx, the maximum height of the guiding portion 11eA is located at the outer end Z4, in the area opposed to the drive pin 22a, at the downstream end of the rotational drive direction, and the maximum height is H4.

On the other hand, the maximum heights on the straight lines Y1 to Yx at the non-guiding portion 11eB are all located outermost in the area opposed to the drive pin 22a (D2 in the figure). Thus, the maximum height of the non-guiding portion 11eB for the straight line Y1 is located at the outer end W1, in the area opposed to the drive pin 22a, at the upstream end of the rotational drive direction, and the height is h1. For the straight line Y2, the maximum height of the non-guiding portion 11eB is located at the outer end W2 (i.e., a height h2), in the area opposed to the drive pin 22a, on the straight line Y2. For the straight line Yx-1, the maximum height of the non-guiding portion 11eB is located at the outer end W3 (i.e., a height h3), in the area opposed to the drive pin, on the straight line Yx-1. For the straight line Yx, the maximum height of the non-guiding portion 11eB is located at the outer end W4, in the area opposed to the drive pin 22a, at the downstream end of the rotational drive direction, and the maximum height is h4.

Figure 14:
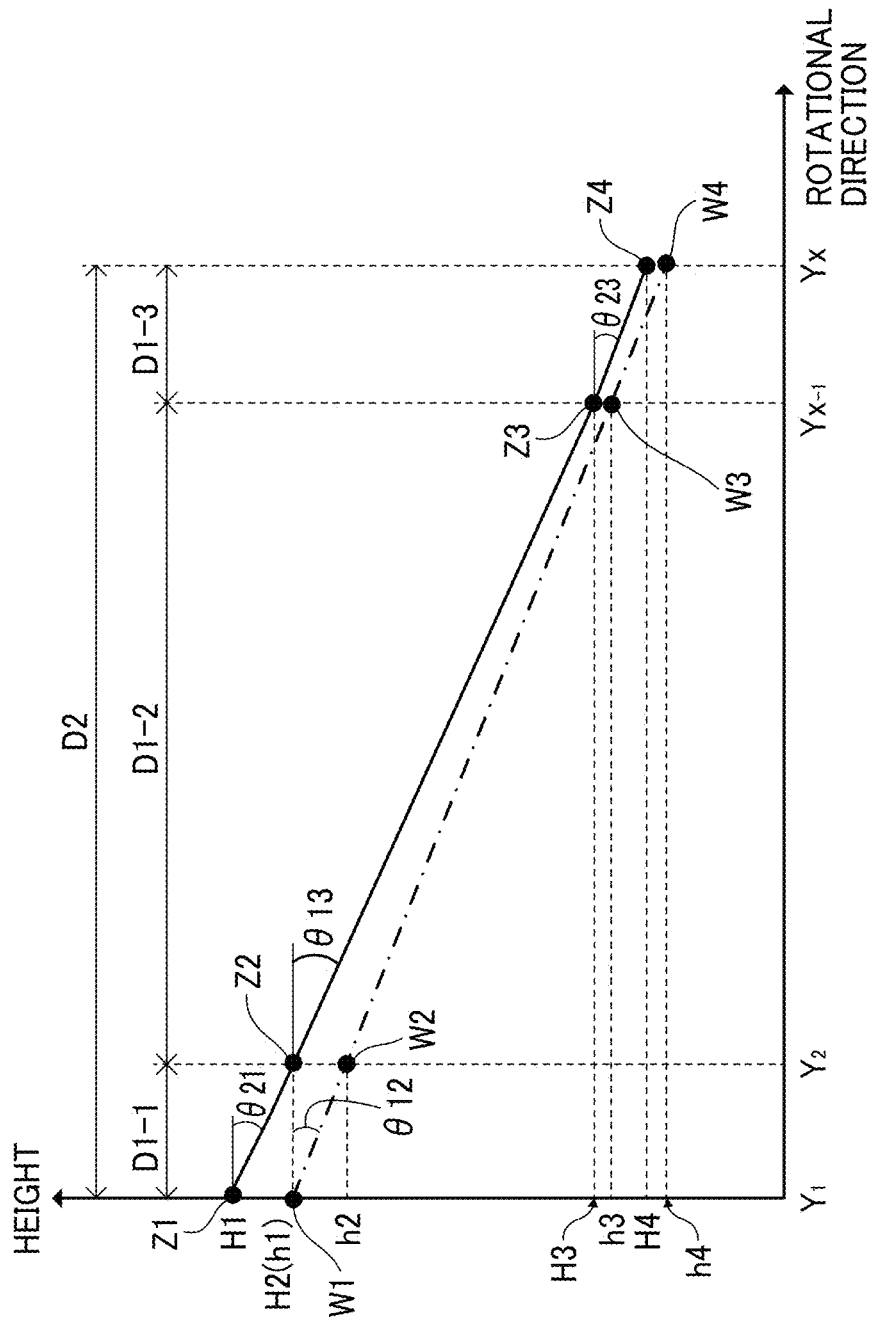
FIG. 14 is a graph indicating the maximum height of a guide portion on each straight line and the maximum height of a non-guide portion on each straight line.

FIG. 14 is a graph indicating the maximum height of the guiding portion 11eA on each straight line Y1 and the maximum height of the non-guiding portion 11eB on each straight line.

As can be seen from FIG. 14, on each of the straight lines Y1 to Yx, the maximum height of the guiding portion 11eA is higher than the maximum height of the non-guiding portion 11eB. Each of the straight lines Y1 to Yx each is regarded as the lowermost portion of the drive pin 22a having an outer circumferential shape (i.e., portion located closest to the coupling portion 100 side of the drive pin 22a).

Thus, since the position of the maximum height on any of the straight lines Y1 to Yx is on the guiding portion 11eA side, when the drive pin 22a and the grooves 11a are misaligned in phase, the drive transmission portion opposed to the guiding portion 11eA of the pair of drive transmission portions 122a contacts on the guiding portion 11eA.

As described above, when a single one of the pair of drive transmission portions 122a contacts on the guiding portion 11eA, the contact resistance is reduced compared to a case in which a projection between adjacent grooves forms a guiding portion and both of the pair of drive transmission portions 122a contact on the guiding portion.

As can be seen from FIG. 14, the contact location of the guiding portion 11eA (i.e., location maximum in height of the guiding portion 11eA on each straight line) has a shape gradually decreasing in height with respect to the grooves toward the downstream side in the rotational drive direction. Thus, pressing force to press the guiding portion 11eA by the drive transmission portions 122a of the drive pin 22a causes the coupling portion 100 (i.e., sheet feed roller 11) to rotate relatively to the drive pin 22a, and the drive transmission portions 122a of the drive pin 22a are led to the grooves 11a. At this time, according to the present embodiment, since the sing one of the pair of drive transmission portions 122a contacts on the guiding portion 11eA, the contact resistance is reduced compared to a case in which both drive transmission portions 122a contact on the guiding portion 11eA. Thus, even a small pressing force causes the coupling portion 100 (i.e., sheet feed roller 11) to easily rotate relatively to the drive pin 22a, and the drive transmission portions 122a of the drive pin 22a are led to the grooves 11a. As a result, the drive transmission portions 122a of the drive pin 22a are reliably fitted in the grooves 11a.

Furthermore, according to the present embodiment, each of the guiding portion 11eA and the non-guiding portion 11eB has a shape gradually decreasing in height with respect to the bottom faces of the grooves 11a toward the downstream side in the rotational drive direction of the sheet feed roller 11. Therefore, the height, from the bottom face of the groove 11a, of the wall face 11d of the groove 11a on which the drive transmission portions 122a of the drive pin 22a contact to transmit the driving force, on the downstream side in the drive transmission direction is made higher than the height of the wall face 11d of the groove 11a on the upstream side. This arrangement allows the drive transmission portions 122a to reliably contact on the wall face 11d of the groove 11a on the downstream side in the drive transmission direction, and preferable drive transmission is performed.

Next, a description is given of removal of the sheet feed roller 11 from the sheet feeding unit 50.

Figure 15A:
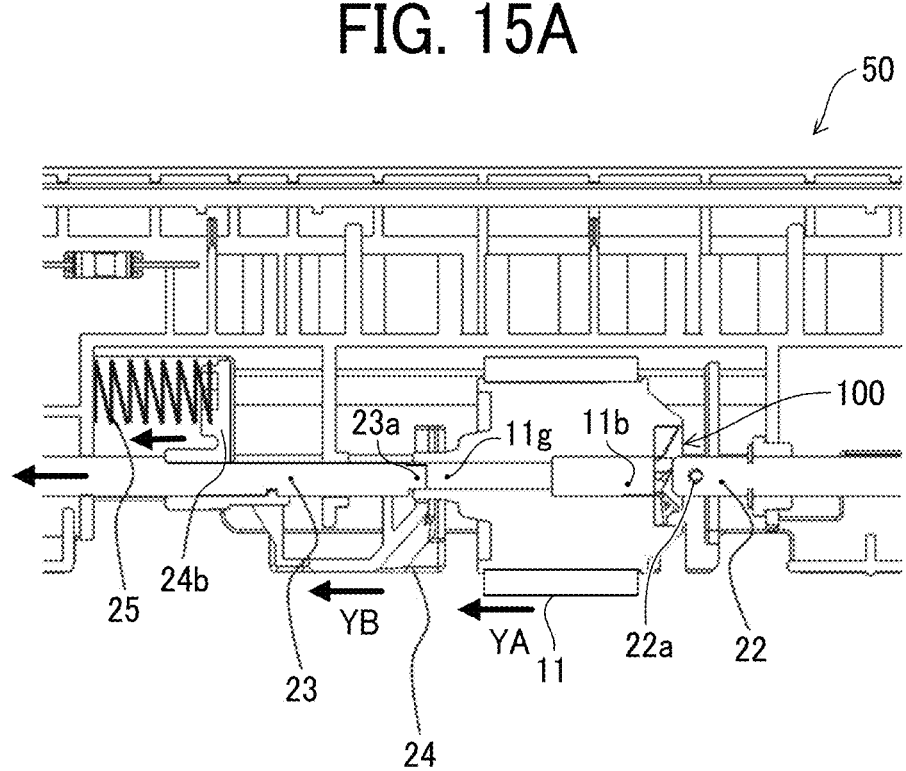
FIGS. 15A, 15B, and 15C are diagrams illustrating respective steps of removing the sheet feed roller from the sheet feeding unit.
Figure 15B:
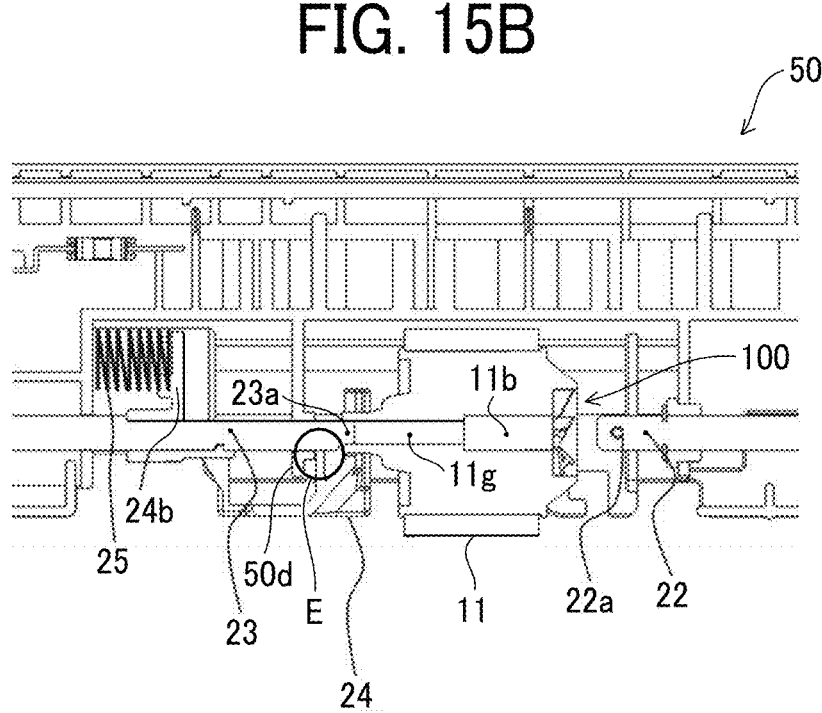
Figure 15C:
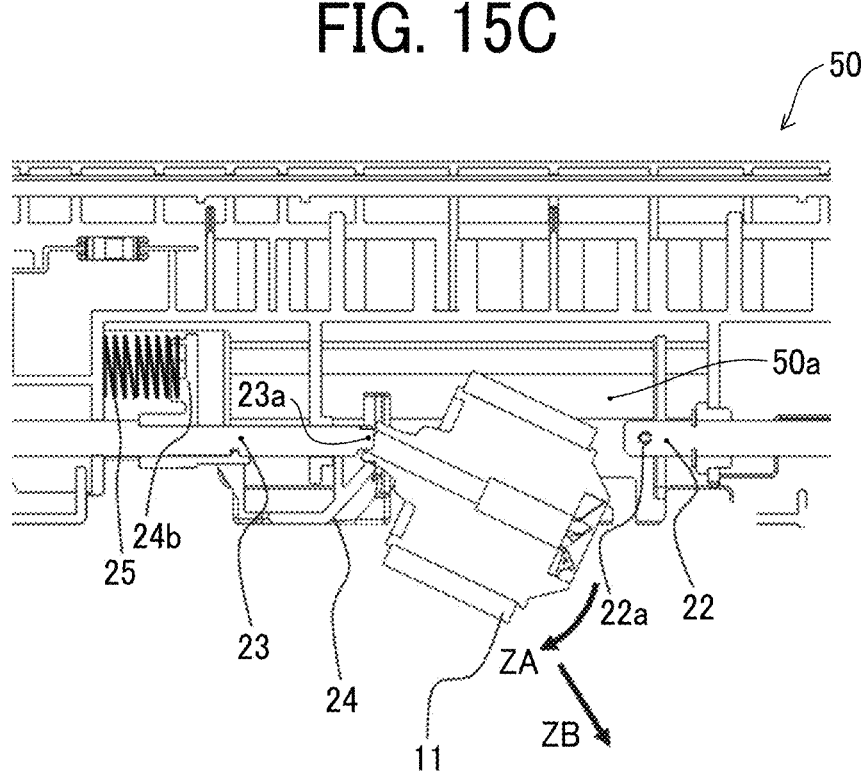

FIGS. 15A, 15B, and 15C are diagrams illustrating respective steps of removing the sheet feed roller 11 from the sheet feeding unit 50.

First, as illustrated in FIGS. 3A and 3B, the sheet tray 30 is detached from the apparatus body of the image forming apparatus 1. Then, the sheet feed roller 11 is grabbed from below, and is pushed onto the left side in FIG. 15A (i.e., arrow YA direction), as illustrated in FIG. 15A. Then, the pressure spring 25 is pushed onto the left side in FIG. 15A via the sliding shaft 23 and the guide 24 secured to the sliding shaft 23. As a result, against the biasing force of the pressure spring 25, the sheet feed roller 11 moves in the direction YA in FIG. 15A, together with the sliding shaft 23 and the guide 24. As the sheet feed roller 11 moves in the direction YA in FIG. 15A, the tip end of the drive shaft 22 comes out of the first supporting hole 11b of the sheet feed roller 11, and the drive pin 22a of the drive shaft 22 comes out of the groove 11a of the coupling portion 100.

When the sheet feed roller 11 further moves in a direction indicated by arrow YB in FIG. 15A, the guide 24 contacts on a supporting wall 50d, as illustrated in circle E in FIG. 15B. As a result, the movement of the sheet feed roller 11 in the direction Y is restricted. When the movement of the sheet feed roller 11 in the direction Y is restricted, the leading end of the drive shaft 22 is completely separate from the sheet feed roller 11.

When the axial movement of the sheet feed roller 11 is restricted, as illustrated in FIG. 15C, the sheet feed roller 11 is tilted in a direction indicated by arrow ZA with respect to the roller support portion 23a of the sliding shaft 23 as a fulcrum, while the sheet feed roller 11 is pushed onto the guide 24 side, against the biasing force of the pressure spring 25. As a result, the sheet feed roller 11 is detached from the sheet feeding unit 50 in a direction indicated by arrow ZB.

When the sheet feed roller 11 is detached, the sliding shaft 23 moves, together with the guide 24, toward the drive shaft 22, due to the biasing force of the pressure spring 25. Then, as previously illustrated in FIG. 7, the guide 24 contacts on the supporting wall 50d from the side opposite to the drive shaft 22 side and the movement to the drive shaft 22 side is restricted.

According to the present embodiment, the sheet feed roller 11 is moved, together with the shaft (i.e., sliding shaft 23) on the side opposite to the drive shaft 22, in the direction away from the drive shaft 22, so that the drive shaft 22 and the sheet feed roller 11 are easily released from the driving connection. Furthermore, the sheet feed roller 11 is retained and supported by the drive shaft 22 and the sliding shaft 23. Thus, the drive shaft 22 and the sliding shaft 23 support the part near the axial ends of the sheet feed roller 11, respectively. Therefore, by simply moving the sheet feed roller 11 to the side slightly opposite to the drive shaft 22, the sheet feed roller 11 is detached from the drive shaft 22. In addition, after the detachment of the sheet feed roller 11 from the drive shaft 22, by simply tilting the sheet feed roller 11 to the sliding shaft 23 (without moving the sheet feed roller 11 to the drive shaft 22), the sheet feed roller 11 is detached from the sliding shaft 23. As a result, the sheet feed roller 11 is easily detached from the image forming apparatus 1.

Next, a description is given of attachment of the sheet feed roller 11.

When a new sheet feed roller 11 is attached to the sheet feeding unit 50, the end of the second supporting hole 11g of the sheet feed roller 11 is pressed against the guide portion 24a of the guide 24 while the sheet feed roller 11 is tilted. Then, the guide 24 moves in the direction away from the drive shaft 22, together with the sliding shaft 23, against the biasing force of the pressure spring 25. The end of the second supporting hole 11g is guided to the roller support portion 23a of the sliding shaft 23 by the mortar-shaped guide portion 24a, thereby falling into the roller support portion 23a. Then, when the guide 24 contacts on the supporting wall 50d from the drive shaft 22 side to change to a similar state to the configuration illustrated in FIG. 15C, the drive shaft 22 side of the sheet feed roller 11 is moved toward the sheet feed roller housing portion 50a of the sheet feeding unit 50 with respect to the roller support portion 23a as a fulcrum, while the sheet feed roller 11 is pushed onto the side opposite to the drive shaft 22. With this operation, the roller support portion 23a of the sliding shaft 23 is inserted into the second supporting hole 11g of the sheet feed roller 11.

According to the present embodiment, the guide 24 is provided so that the guide portion 24a of the guide 24 guides the second supporting hole 11g of the sheet feed roller 11 to the roller support portion 23a. This arrangement allows the roller support portion 23a of the sliding shaft 23 to contact the second supporting hole 11g, without visual verification of the positional relationship between the roller support portion 23a of the sliding shaft 23 and the second supporting hole 11g of the sheet feed roller 11. Furthermore, the sheet feed roller 11 is retained and supported by the drive shaft 22 and the sliding shaft 23, and the tip end of the sliding shaft 23 is inserted into the second supporting hole 11g. As a result, when the sheet feed roller 11 that is tilted is brought to be parallel to the axial direction (without axial movement after the insertion of the tip end of the roller support portion 23a into the second supporting hole 11g), the sheet feed roller 11 is assembled to the sliding shaft 23. Thus, the sheet feed roller 11 is easily assembled to the sliding shaft 23.

When the drive shaft 22 side of the sheet feed roller 11 is fitted in the sheet feed roller housing portion 50a of the sheet feeding unit 50 to change a state to be similar to the configuration illustrated in FIG. 15B. When the pushing force to the sliding shaft 23 side of the sheet feed roller 11 is reduced from the state, the biasing force of the pressure spring 25 causes the sheet feed roller 11 to move toward the drive shaft 22. As a result, the drive shaft 22 and the sheet feed roller 11 are coupled.

When connecting the drive shaft 22 and the sheet feed roller 11, when the grooves 11a of the coupling portion 100 of the sheet feed roller 11 and the drive pin 22a are misaligned in position in the rotational direction, the drive transmission portions 122a of the drive pin 22a fail to be fitted in the grooves 11a, resulting in incompletion of the driving connection. According the present embodiment, the sheet feed roller 11 is located at the lower portion of the apparatus body of the image forming apparatus 1. Thus, it is difficult to visually check whether the drive pin 22a has been fitted in the grooves 11a of the coupling portion 100. Thus, even if the drive transmission portions 122a of the drive pin 22a have not been actually fitted in the grooves 11a of the coupling portion 100, it is likely to be determined mistakenly that the sheet feed roller 11 has been assembled to the drive shaft 22. As a result, when a first sheet is fed after replacement, the sheet feed roller 11 does not rotationally drive until the drive transmission portions 122a are fitted in the grooves 11a. Therefore, it is likely that the sheet feeding delay occurs to lead to a trouble such as paper jam.

Furthermore, even if the drive transmission portions 122a of the drive pin 22a have not been fitted in the grooves 11a of the coupling portion 100, it may be mistakenly determined that the sheet feed roller 11 has been assembled to the drive shaft 22 and the state is maintained. At this time, in a case in which the sheet feed roller 11 moves due to impact in a direction to separate from the drive shaft 22 against the biasing force of the pressure spring 25, the engagement (connection) of the drive shaft 22 and the sheet feed roller 11 is completely broken. Consequently, the drive shaft 22 side of the sheet feed roller 11 falls by the weight of the sheet feed roller 11, and therefore it is likely that the sheet feed roller 11 comes off from the sheet feeding unit 50. Such a case may occur because, in view of the assembly performance of the sheet feed roller 11, the sheet feed roller 11 is retained and supported by the sliding shaft 23 and the drive shaft 22 and the sheet feed roller 11 is not supported by the sliding shaft 23 alone.

In particular, according to the present embodiment, it is difficult to increase the biasing force of the pressure spring 25, in view of the assembly performance of the sheet feed roller 11. Thus, the sheet feed roller 11 tends to easily move in the direction away from the drive shaft 22 due to impact against the biasing force of pressure spring 25. Therefore, if the drive transmission portions 122a of the drive pin 22a are left to be incompletely fitted in the grooves 11a of the coupling portion 100, the sheet feed roller 11 easily comes off from the sheet feeding unit 50.

However, according to the present embodiment, the coupling portion 100 has an arrangement as illustrated in FIGS. 12A to 14. Therefore, even if the drive shaft 22 has been assembled to the sheet feed roller 11 in a state in which the positions of the grooves 11a in the rotational direction and the position of the drive pin 22a in the rotational direction are misaligned at the coupling portion 100 of the sheet feed roller 11, the coupling portion 100 (i.e., the sheet feed roller 11) easily rotates relatively to the drive shaft 22 to allow the drive transmission portions 122a of the drive pin 22a to be fitted in the grooves 11a of the coupling portion 100.

Next, a detailed description is given of the assembly of the sheet feed roller 11 and the drive shaft 22 at the coupling portion 100.

As described above, the pressing force to the guide 24 side of the sheet feed roller 11 is reduced, and the biasing force of the pressure spring 25 causes the sheet feed roller 11 being held by hand to move to the drive shaft 22 side. At this time, when the sheet feed roller 11 is tilted with respect to the roller support portion 23a at the tip end of the sliding shaft 23 as a fulcrum, the tip end of the drive shaft 22 contacts on the shaft guide 11f of the coupling portion 100. As illustrated in FIG. 12A, the shaft guide 11f is sloped in the direction toward the axial center O. Thus, when the drive shaft 22 contacts the shaft guide 11f, a force in a normal line direction acts on the sheet feed roller 11, due to a reaction force from the tip end of the drive shaft 22. As a result, the sheet feed roller 11 pivots with respect to the roller support portion 23a as a fulcrum, and the tilt is corrected. Then, the shaft guide 11f relatively guides the tip end of the drive shaft 22 in the direction toward the first supporting hole 11b. With this arrangement, the axial center O of the sheet feed roller 11 is aligned with the axial center O of the drive shaft 22, the tip end of the drive shaft 22 is inserted into the first supporting hole 11b, and the sheet feed roller 11 is retained and supported by the drive shaft 22 and the roller support portion 23a.

As described above, by providing the shaft guide 11f at the coupling portion 100, the sheet feed roller 11 is assembled to the drive shaft 22, even with the sheet feed roller 11 slightly tilted to the drive shaft 22. Thus, the replacement workability of the sheet feed roller 11 is enhanced.

After the sheet feed roller 11 is retained and supported by the drive shaft 22 and the roller support portion 23a, the user may release his or her hand from the sheet feed roller 11. Furthermore, according to the present embodiment, a clutch is provided at a drive transmission portion 122a that transmits a driving force of a sheet feeding motor M to the drive shaft 22. In replacement of the sheet feed roller 11, the clutch is disengaged to facilitate the rotation of the drive shaft 22. Therefore, after the sheet feed roller 11 is retained and supported by the drive shaft 22 and the roller support portion 23a, the drive shaft 22 is rotated to make a driving connection without releasing of the hand from the sheet feed roller 11.

From the state in which the sheet feed roller 11 is retained and supported by the drive shaft 22 and the roller support portion 23a, the biasing force of the pressure spring 25 causes the sheet feed roller 11 to move to the drive shaft 22 side. At this time, when the drive transmission portions 122a of the drive pin 22a and the grooves 11a of the coupling portion 100 are misaligned in position in the rotational direction, the single drive transmission portion 122a opposed to the guiding portion 11eA of the pair of the drive transmission portions 122a of the drive pin 22a contacts the guiding portion 11eA.

As described above, since the guiding portion 11eA is sloped in the rotational drive direction (the direction indicated by arrow R in FIGS. 10A to 10C), a force in the rotational direction acts on the sheet feed roller 11 and the drive pin 22a, due to the biasing force of the pressure spring 25 received by the drive transmission portion 122a from the guiding portion 11eA. At this time, with the sheet feed roller 11 grabbed by the worker, the drive shaft 22 rotates. With the sheet feed roller 11 released from the worker' hand, either the sheet feed roller 11 or the drive shaft 22 rotates. As described above, when the sheet feed roller 11 rotates relatively to the drive shaft 22, the guiding portion 11eA causes the drive transmission portions 122a of the drive pin 22a to move relatively to the grooves 11a, and the drive transmission portions 122a are fitted in the grooves 11a. As a result, the sheet feed roller 11 and the drive shaft 22 are drivingly connected, and the assembling of the sheet feed roller 11 to the drive shaft 22 is completed.

According to the present embodiment, the one of the pair of drive transmission portions 122a projecting from the drive shaft 22 of the drive pin 22a contacts the guiding portion 11eA. Thus, the contact resistance is reduced compared to a case in which both of the pair of drive transmission portions 122a contact the guiding portion. As a result, the biasing force of the pressure spring 25 facilitates relative rotation of the sheet feed roller 11 to the drive shaft 22, and the drive transmission portions 122a is reliably fitted in the grooves 11a.

In addition, in the assembling, the drive transmission portions 122a are fitted in the grooves 11a to allow drive transmission to be performed from the drive shaft 22 to the sheet feed roller 11. As a result, even for feeding of a first sheet after the replacement of the sheet feed roller 11, the sheet P is fed satisfactorily without occurrence of delay in the sheet feeding.

Moreover, the one of the pair of drive transmission portions 122a projecting from the drive shaft 22 of the drive pin 22a contacts on the guiding portion 11eA to reduce the contact resistance of the drive transmission portion with the guiding portion. Thus, even with a small pressing force, the sheet feed roller 11 rotates relatively to the drive shaft 22, and the drive transmission portions 122a are fitted in the grooves 11a. As a result, the biasing force of the pressure spring 25 is reduced, and the assembly performance of the sheet feed roller 11 to the sheet feeding unit 50 is enhanced.

Furthermore, in the assembling of the sheet feed roller 11, when the drive transmission portions 122a are reliably fitted in the grooves, even if the sheet feed roller 11 slightly moves in the direction away from the drive shaft 22 against the biasing force of the pressure spring 25 due to an impact, the sheet feed roller 11 is prevented from complete removal from the drive shaft 22 and is prevented from removal from the sheet feeding unit 50.

Furthermore, with the sheet feed roller 11 assembled to the drive shaft 22 (the drive transmission portions 122a fitted in the grooves 11a), even in a case in which the sheet feed roller 11 moves in the direction away from the drive shaft 22 against the biasing force of the pressure spring 25 due to an impact, resulting in misalignment between the drive transmission portions 122a and the grooves 11a in position in the rotational direction due to removal of the drive transmission portions 122a from the grooves 11a, the biasing force of the pressure spring 25 facilitates relatively rotation of the sheet feed roller 11 to the drive shaft 22, and the drive transmission portions 122a are reliably fitted in the grooves 11a. Therefore, without leaving the drive transmission portions 122a being removed from the grooves 11a, paper jam due to a delay in the start of driving of the sheet feed roller and removal of the sheet feed roller 11 from the sheet feeding unit 50 are prevented.

The shape of the coupling portion 100 is not limited to in the above-described embodiments. For example, the coupling portion 100 is at least to have a shape that allows contact with the one drive transmission portion of a pair of drive transmission portions and guide to the grooves. For example, in the present embodiment, the non-guiding portions 11eB may have a planar shape and identical in height with respect to the bottom faces of the groove 11a in the rotational direction.

In addition, another coupling portion that functions as a second unit or as a part of a second unit may be provided with a drive transmission portion insertable into the groove 11a of the coupling portion 100 and may be attached to the tip end of the drive shaft 22, and a driving connection may be made between the coupling portion (as a second unit) and the coupling portion 100 of the sheet feed roller 11. Moreover, another coupling portion having a groove as a first member may be provided at the leading end of the drive shaft, and an insertion portion insertable into the groove of the coupling portion provided at the drive shaft may be provided on the sidewall on the drive shaft side of the sheet feed roller.

In the above description, the sheet feed roller 11 that feeds sheets loaded on the sheet tray 30 has been described but is not limited to this configuration. For example, a bypass sheet feed roller 17 that feeds sheets on a bypass tray 40 may have a configuration similar to the configuration of the sheet feed roller 11.

Furthermore, for example, the embodiment of the present invention is also applicable to a sheet feed roller of an automatic document feeder (ADF) 150 that functions as a sheet feeding device.

Figure 16:
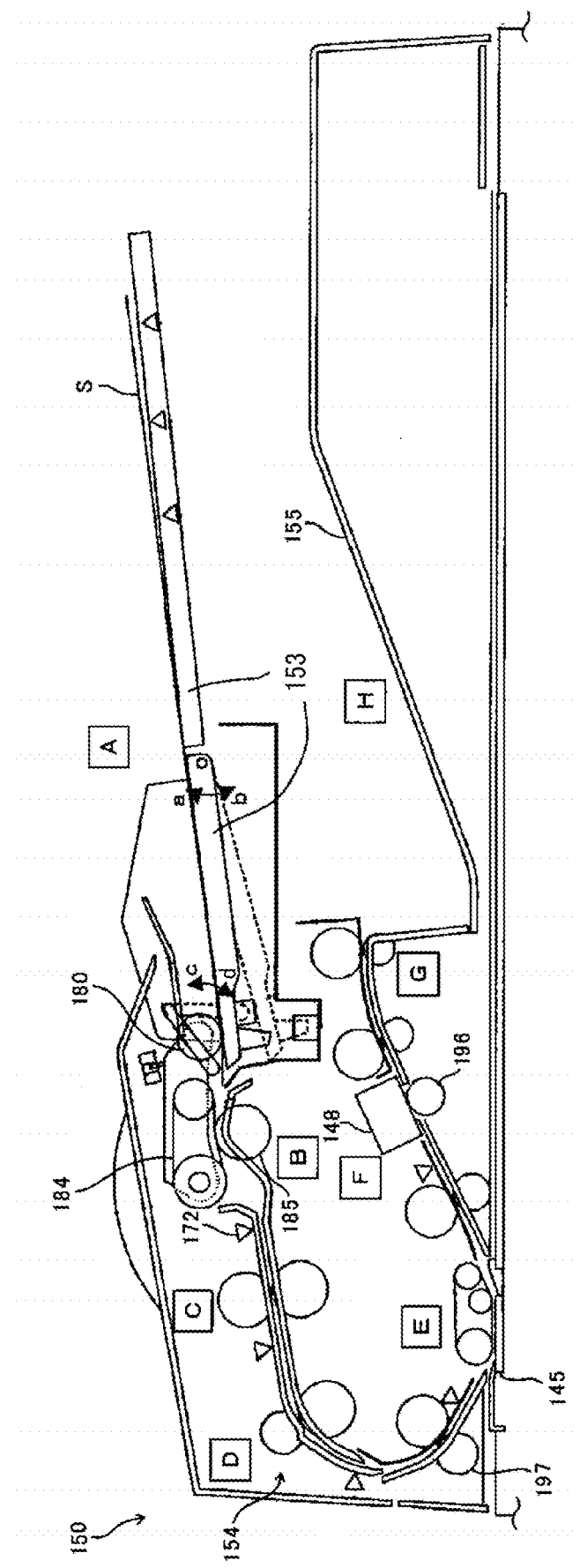
FIG. 16 is an enlarged view illustrating a main configuration of an automatic document feeder and an upper portion of a scanner.

FIG. 16 is an enlarged view illustrating a main configuration of the ADF 150 and an upper portion of a scanner.

The ADF 150 according to the present embodiment includes a document setting part A, a document separating and feeding part B, a registration part C, a turning part D, a first reading and conveying part E, a second reading and conveying part F, a document ejecting part G, and a document stacking part H.

An original document conveying unit 154 of the ADF 150 forms a conveyance passage for conveying a document S from a position at which sensing is performed by a contact sensor 172 located downstream the separation and feeding unit B to a reading entrance roller 197.

The ADF 150 is a sheet-through type automatic document feeder that includes a document feeding port that receives a document S set on the document setting part A, into the image forming apparatus 1, and a sheet ejection port that ejects the document S with an image, onto the document stacking part H.

A document conveyance and reading unit including the ADF 150 conveys a document S as a recording medium to be read to a first side reading unit and a second side reading unit, each of which functioning as a secured reading device, and reads an image while conveying at a predetermined speed.

The document setting part A has a document loading table 153 on which a bundle of documents S is to be set such that the respective first sides of the documents S face upward.

The document separating and feeding part B includes a pickup roller 180, a separation belt 184, and a reverse roller 185. The document separating and feeding part B separates and feeds the documents S one by one from the bundle of documents S set on the document loading table 153.

The registration part C has a function of temporarily contacting and aligning the document S fed from the document separating and feeding part B, and a function of drawing out and conveying the document S after the alignment.

The turning part D has a conveyance passage curved in a C-shape, and turns the document S to be conveyed in the curved conveyance passage so as to reverse the document S upside down while turning the document S back, and conveys so as to face the first side of the document S on the first side reading unit below.

The first reading and conveying part E has a first contact glass 145 including an exposure glass and conveys the document S onto the first contact glass 145. Then, while conveying, the first reading and conveying part E causes the first side reading unit disposed inside the scanner to read an image of the first side of the document S from below the first contact glass 145. Then, while conveying, the first reading and conveying part E causes the first side reading unit disposed inside the scanner to read an image of the first side of the document S from below the first contact glass 145.

The second reading and conveying part F causes a second side reading unit 148 to read an image of the second side of the document S passed through the first reading and conveying part E, while conveying the document S with a second-reading-unit opposing roller 196 disposed below the second side reading unit 148.

The document ejecting part G ejects the document S passed through the second reading and conveying part F toward the document stacking part H outside the ADF 150.

The document stacking part H stacks and retains the document S after completion of the reading, on a document stacking table 155.

The present disclosure is also applicable to a pickup roller 180 of the ADF 150 illustrated in FIG. 16. Moreover, the present disclosure is applicable not only to a sheet feed roller but also to a conveying roller such as a registration roller. Furthermore, the present disclosure is applicable to a coupling portion that makes a driving connection between a shaft of a rotator such as a photoconductor or a developing roller provided at an attachable and detachable unit such as a process cartridge that is detachably attached to the apparatus body of an image forming apparatus and a drive shaft of a driving device on the apparatus body side.

The configurations according to the above-descried embodiments are not limited thereto. This disclosure can achieve the following aspects effectively.

Aspect 1.

In Aspect 1, a drive transmitter (for example, the sheet feeding unit 50) includes a first unit (for example, the sheet feed roller 11) and a second unit (for example, the drive shaft 22). The first unit includes a coupling portion (for example, the coupling portion 100) having grooves (for example, the grooves 11a), including a pair of grooves. The grooves are spaced at an angle of 180 degrees in a rotational direction of the first unit. The second unit has projections (for example, the pair of drive transmission portions 122a), including a pair of projections. The projections are spaced at an angle of 180 degrees in a rotational direction of the second unit. The projections of the second unit are configured to be inserted into the grooves of the coupling portion. The coupling portion further has a guide portion (for example, the guiding portion 11eA) and a non-guiding portion (for example, the non-guiding portions 11eB). The guiding portion is sloped, with a height from a bottom face of the grooves decreasing in the rotational direction of the first unit. The guiding portion is configured to guide the projections of the second unit to the grooves of the coupling portion. The non-guiding portion (for example, the non-guiding portion 11eB) is disposed at a point symmetrical position to the guiding portion with respect to an axial center (for example, the axial center O) of the first unit. One of the projections is not in contact with the non-guiding portion while another one of the projections, which is disposed opposite the one of the projections, is in contact with the guiding portion.

According to the configuration of Aspect 1, the coupling portion of the first unit has the guiding portion sloped such that the guiding portion gradually decreases in height in the rotational direction with respect to the bottom faces of the grooves. Thus, when the projections are misaligned with the grooves of the coupling portion of the first unit in position in the rotational direction, the projections of the second unit contact on the guiding portion, and the first unit rotates relatively to the projections due to a force applied to the guiding portion from the projections. As a result, the projections are insertable into the grooves. Moreover, since the single one of the pair of projections contacts the guiding portion, the contact resistance is reduced compared to a configuration in which both of the pair of projections contact the guiding portions, and a force of the projections pushing axially the guiding portion facilitates relative rotation of the first unit to the drive transmission portions. Thus, the projections are easily insertable into the grooves.

Aspect 2.

In Aspect 1, in an area facing the projections, the axial center of the first unit (for example, the sheet feed roller 11) and a portion at a maximum height from the bottom face of the grooves (for example, the grooves 11a) on a straight line passing the guiding portion (for example, the guiding portion 11eA) and the non-guiding portion (for example, the non-guiding portion 11eB) are on the guiding portion.

With this arrangement, as described in the above embodiment, when the grooves (for example, the grooves 11a) and the projections (for example, the drive transmission portions 122a) are misaligned in position in the rotational direction, the single one of the pair of projections contacts the guiding portion.

Aspect 3.

In Aspect 1 or Aspect 2, the drive transmitter further includes a biasing body (for example, the pressure spring 25). The biasing body is configured to bias one of the first unit and the second unit toward another one of the first unit and the second unit.

According to the configuration of Aspect 3, as described in the above embodiment, when the projections (for example, the drive transmission portions 122a) contact the guiding portion (for example, the guiding portion 11eA), a pressing force between the projections and the guiding portion is generated due to the biasing force of the biasing body (for example, the pressure spring 25). Thus, the first unit (for example, the sheet feed roller 11) is rotated relatively to the second unit (for example, the drive shaft 22). With this arrangement, the guiding portion guides the projections to the grooves.

Aspect 4.

In any one of Aspects 1 to 3, the coupling portion has a sloped face (for example, the shaft guide 11f) at a position close to the axial center of the first unit, a height of the sloped face from the bottom face of the grooves decreasing toward the axial center of the first unit.

According to the configuration of Aspect 4, as described in the above embodiment, in assembling of the second unit (for example, the drive shaft 22) and the first unit (for example, the sheet feed roller 11), when the axial center of the first unit and the axial center of the second unit are misaligned, the leading end of the second unit contacts the sloped face (for example, the shaft guide 11f). Thus, the second unit is relatively moved to the axial center side of the first unit. With this arrangement, the axial center of the first unit and the axial center of the second unit is aligned.

Aspect 5.

In any one of Aspects 1 to 4, the first unit is a roller (for example, the sheet feed roller 11) and the second unit is a drive shaft (for example, the drive shaft 22).

According to the configuration of Aspect 5, as described in the above embodiment, a driving connection is easily made between the drive shaft and the roller.

Aspect 6.

In Aspect 5, the drive transmitter further includes a biasing body (for example, the pressure spring 25) configured to apply a biasing force. The roller is biased toward the drive shaft by the biasing body. The roller is configured to move in a direction against the biasing force of the biasing body to be attached to or detached from the drive transmitter.

According to the configuration of Aspect 6, as described in the above embodiment, simple movement of the roller (for example, the sheet feed roller 11) in the direction against the biasing body (for example, the pressure spring 25) allows removal from the drive shaft (for example, the drive shaft 22) and allows assembling of the roller to the drive shaft with the biasing force of the biasing body. With this arrangement, the replaceability of the roller is enhanced.

Aspect 7.

In Aspect 5 or Aspect 6, the roller includes a sheet feed roller (for example, the sheet feed roller 11) configured to convey a sheet (the sheet P).

According to the configuration of Aspect 7, the sheet feed roller is easily made a driving connection to the drive shaft (for example, the drive shaft 22).

Aspect 8.

In any one of Aspect 1 to 7, the grooves extend radially from the axial center of the first unit.

According to the configuration of Aspect 8, the projections (for example, the drive transmission portions 122a) are fitted in the grooves (for example, the grooves 11a).

Aspect 9.

In any one of Aspect 1 to 8, the guiding portion is sloped, with the height from the bottom face of the grooves decreasing toward a downstream side in the rotational direction of the first unit.

According to the configuration of Aspect 9, as described in the above embodiment, the height of the wall face (for example, the wall face 11d) of the groove (for example, the grooves 11a) on which the projections (for example, the drive transmission portions 122a) contact for transmission for the driving force, on the downstream side in the rotational drive direction is made higher. Thus, the driving force is reliably transmitted from the projections.

Aspect 10.

In Aspect 10, a sheet feeding device (for example, the automatic document feeder 150) includes a conveyance body (for example, the sheet feed roller 11) configured to convey a sheet (for example, the sheet P), and the drive transmitter (for example, the sheet feeding unit 50) according to any one of Aspects 1 to 9, configured to transmit driving force of a drive source (for example, the sheet feeding motor M) to the conveyance body.

According to the configuration of Aspect 10, a driving connection is reliably made between the conveyance body and a drive shaft (for example, the drive shaft 22).

Aspect 11.

In Aspect 11, an image forming apparatus (for example, the image forming apparatus 1) includes a drive source (for example, the sheet feeding motor M), a rotary body (for example, the sheet feed roller 11), and the drive transmitter (for example, the sheet feeding unit 50) according to any one of Aspects 1 to 9, configured to transmit driving force of the drive source to the rotary body.

According to the configuration of Aspect 11, a driving connection is reliably made between the rotary body and a drive shaft (for example, the drive shaft 22).

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of the invention, and are included in the scope of the invention recited in the claims and its equivalent.

What is claimed is:

1. A drive transmitter comprising:
a first unit including a coupling portion having grooves, including a pair of grooves,
the grooves spaced at an angle of 180 degrees in a rotational direction of the first unit; and
a second unit having projections, including a pair of projections,
the projections spaced at an angle of 180 degrees in a rotational direction of the second unit,
the projections configured to be inserted into the grooves of the coupling portion,
the coupling portion further having a guiding portion and a non-guiding portion,
the guiding portion having an upstream face and a downstream face relative to the rotational direction, and an upper face between the upstream and downstream faces, the upper face being sloped from the upstream face to the downstream face in the rotational direction of the first unit, a height of the upper face from a bottom face of the grooves being greatest at the upstream face, and the height of the upper face from the bottom face of the grooves decreasing in the rotational direction of the first unit,
the guiding portion configured to guide the projections of the second unit to the grooves of the coupling portion,
the non-guiding portion disposed at a point symmetrical position to the guiding portion with respect to an axial center of the first unit,
one of the projections being not in contact with the non-guiding portion while another one of the projections, which is disposed opposite the one of the projections, is in contact with the guiding portion.

2. The drive transmitter according to claim 1,
wherein a straight line is on a guiding portion, the straight line passing the guiding portion, the non-guiding portion, and the axial center of the first unit, the straight line being parallel to the bottom face of the grooves, and a maximum height of the guiding portion from the bottom face of the grooves on the straight line is greater than a maximum height of the non-guiding portion from the bottom face of the groves on the straight line.

3. The drive transmitter according to claim 1, further comprising:
a biasing body configured to bias one of the first unit and the second unit toward another one of the first unit and the second unit.

4. The drive transmitter according to claim 1,
wherein the coupling portion has a sloped face adjacent the guiding portion, the sloped face being closer to the axial center of the first unit than the guiding portion, and a height of the sloped face from the bottom face of the grooves decreasing toward the axial center of the first unit.

5. The drive transmitter according to claim 1,
wherein the first unit is a roller and the second unit is a drive shaft.

6. The drive transmitter according to claim 5, further comprising a biasing body configured to apply a biasing force,
wherein the roller is biased toward the drive shaft by the biasing body, and
wherein the roller is configured to move in a direction against the biasing force of the biasing body to be attached to or detached from the drive transmitter.

7. The drive transmitter according to claim 5,
wherein the roller includes a sheet feed roller configured to convey a sheet.

8. The drive transmitter according to claim 1,
wherein the grooves extend radially from the axial center of the first unit.

9. The drive transmitter according to claim 1,
wherein the guiding portion is sloped, with the height from the bottom face of the grooves decreasing toward a downstream side in the rotational direction of the first unit.

10. A sheet feeding device comprising:
a conveyance body configured to convey a sheet; and
the drive transmitter according to claim 1, configured to transmit driving force of a driving source to the conveyance body.

11. An image forming apparatus comprising:
a drive source;
a rotary body; and
the drive transmitter according to claim 1, configured to transmit driving force of the drive source to the rotary body.

12. A drive transmitter comprising:
a first unit including a coupling portion having grooves, including a pair of grooves,
the grooves spaced at an angle of 180 degrees in a rotational direction of the first unit; and
a second unit having projections, including a pair of projections,
the projections spaced at an angle of 180 degrees in a rotational direction of the second unit,
the projections configured to be inserted into the grooves of the coupling portion,
the coupling portion further having a guiding portion and a non-guiding portion, the guiding portion being sloped from a higher end to a lower end in the rotational direction of the first unit, the guiding portion configured to guide the projections of the second unit to the grooves of the coupling portion, the non-guiding portion disposed at a point symmetrical position to the guiding portion with respect to an axial center of the first unit, having a height from a bottom face of the grooves less than a height of the guiding portion from a bottom face of the grooves, one of the projections being not in contact with the non-guiding portion while another one of the projections, which is disposed opposite the one of the projections, is in contact with the guiding portion, and the coupling portion having a sloped face adjacent the guiding portion closer to the axial center of the first unit than the guiding portion, a height of the sloped face from the bottom face of the grooves decreasing toward the axial center of the first unit.

13. The drive transmitter according to claim 12, wherein a straight line is on a guiding portion, the straight line passing the guiding portion, the non-guiding portion, and the axial center of the first unit, the straight line being parallel to the bottom face of the grooves, and a maximum height of the guiding portion from the bottom face of the grooves on the straight line is greater than a maximum height of the non-guiding portion from the bottom face of the groves on the straight line.

14. The drive transmitter according to claim 12, further comprising:

a biasing body configured to bias one of the first unit and the second unit toward another one of the first unit and the second unit.

\* \* \* \* \*